United States Patent
Beard et al.

(10) Patent No.: US 9,021,384 B1
(45) Date of Patent: Apr. 28, 2015

(54) INTERACTIVE VEHICLE INFORMATION MAP

(71) Applicant: Palantir Technologies Inc., Palo Alto, CA (US)

(72) Inventors: Mitchell Beard, Jersey City, NJ (US); Michael Glazer, San Francisco, CA (US); Robin Lim, Mountain View, CA (US); Sina Iman, Washington, DC (US); Mark Basoa, New York, NY (US); Tristan Huber, Seattle, WA (US); Paul Ryan, New York, NY (US); Youssef Moussaoui, Palo Alto, CA (US); Bonnie McLindon, Baton Rouge, LA (US); Nick White, London (GB); Alexander Vasilyev, Manhattan Beach, CA (US); Mark Lundquist, Herndon, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/294,098

(22) Filed: Jun. 2, 2014

Related U.S. Application Data

(60) Provisional application No. 61/899,661, filed on Nov. 4, 2013.

(51) Int. Cl.
*G06F 3/048* (2013.01)
*G06K 9/00* (2006.01)
(Continued)

(52) U.S. Cl.
CPC .......... *G06F 3/0481* (2013.01); *G06F 3/04842* (2013.01); *G06K 9/00825* (2013.01); *G06F 17/30274* (2013.01)

(58) Field of Classification Search
CPC .................... G06F 17/30274; G06F 17/30277; G06F 17/3028; G06F 3/0481; G06F 3/04842; G06F 3/04817; G06F 3/0483; G06F 3/0488; G06F 3/04886; H04N 1/00442; H04N 1/00461; H04N 1/00464; G06K 9/00825; G06K 9/00771

USPC ......... 715/760, 780, 781, 784, 792, 850, 863; 707/E17.018, E17.019, 723, 724; 382/105

See application file for complete search history.

(56) References Cited

U.S. PATENT DOCUMENTS 4,899,161 A 2/1990 Morin et al.
(Continued)

FOREIGN PATENT DOCUMENTS

EP 0 763 201 3/1997
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — James T Durkin
(74) *Attorney, Agent, or Firm* — Knobbe, Martens, Olson & Bear, LLP

(57) ABSTRACT

An interactive vehicle information map system is disclosed in which, in various embodiments, geographical, geospatial, vehicle, and other types of data, geodata, objects, features, and/or metadata are efficiently presented to a user on an interactive map interface. In an embodiment, the user may search vehicle-related data via the interactive map by providing search criteria including, for example, information regarding a geographic area, a time period, a vehicle, a vehicle owner, and/or a license plate number, among other items. The map system may provide search results including a list of vehicles that match the search criteria, vehicle information, and/or points on the interactive map that indicate license-plate recognition read locations, among other information. In an embodiment, the user may view detailed information associated with particular vehicles including, for example, captured images, vehicle-owner data, event history, and the like. Further, the user may export data and/or create search alerts.

20 Claims, 17 Drawing Sheets

(51) Int. Cl.
  *G06F 17/30*     (2006.01)
  *G06F 3/0481*    (2013.01)
  *G06F 3/0484*    (2013.01)

(56) References Cited

U.S. PATENT DOCUMENTS

| | | | |
|---|---|---|---|
| 4,958,305 A | 9/1990 | Piazza | |
| 5,109,399 A | 4/1992 | Thompson | |
| 5,329,108 A | 7/1994 | Lamoure | |
| 5,632,009 A | 5/1997 | Rao et al. | |
| 5,670,987 A | 9/1997 | Doi et al. | |
| 5,754,182 A | 5/1998 | Kobayashi | |
| 5,781,195 A | 7/1998 | Marvin | |
| 5,781,704 A * | 7/1998 | Rossmo | 706/45 |
| 5,845,300 A | 12/1998 | Comer | |
| 6,057,757 A | 5/2000 | Arrowsmith et al. | |
| 6,091,956 A * | 7/2000 | Hollenberg | 455/456.5 |
| 6,157,747 A | 12/2000 | Szeliski et al. | |
| 6,161,098 A | 12/2000 | Wallman | |
| 6,173,067 B1 | 1/2001 | Payton et al. | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,369,835 B1 | 4/2002 | Lin | |
| 6,389,289 B1 | 5/2002 | Voce et al. | |
| 6,414,683 B1 | 7/2002 | Gueziec | |
| 6,456,997 B1 | 9/2002 | Shukla | |
| 6,483,509 B1 | 11/2002 | Rabenhorst | |
| 6,529,900 B1 | 3/2003 | Patterson et al. | |
| 6,549,944 B1 | 4/2003 | Weinberg et al. | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,662,103 B1 | 12/2003 | Skolnick et al. | |
| 6,714,936 B1 | 3/2004 | Nevin, III | |
| 6,757,445 B1 | 6/2004 | Knopp | |
| 6,775,675 B1 | 8/2004 | Nwabueze et al. | |
| 6,828,920 B2 * | 12/2004 | Owen et al. | 340/941 |
| 6,839,745 B1 | 1/2005 | Dingari et al. | |
| 6,877,137 B1 | 4/2005 | Rivette et al. | |
| 6,976,210 B1 | 12/2005 | Silva et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witkowski et al. | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,375,732 B2 | 5/2008 | Arcas | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,457,706 B2 | 11/2008 | Melero et al. | |
| 7,467,375 B2 | 12/2008 | Tondreau et al. | |
| 7,502,786 B2 | 3/2009 | Liu et al. | |
| 7,519,470 B2 | 4/2009 | Brasche et al. | |
| 7,525,422 B2 | 4/2009 | Bishop et al. | |
| 7,529,195 B2 | 5/2009 | Gorman | |
| 7,529,727 B2 | 5/2009 | Arning et al. | |
| 7,539,666 B2 | 5/2009 | Ashworth et al. | |
| 7,546,245 B2 | 6/2009 | Surpin | |
| 7,558,677 B2 | 7/2009 | Jones | |
| 7,574,428 B2 | 8/2009 | Leiserowitz et al. | |
| 7,579,965 B2 * | 8/2009 | Bucholz | 340/937 |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,640,173 B2 | 12/2009 | Surpin et al. | |
| 7,663,621 B1 | 2/2010 | Allen et al. | |
| 7,703,021 B1 | 4/2010 | Flam | |
| 7,712,049 B2 | 5/2010 | Williams et al. | |
| 7,716,067 B2 | 5/2010 | Surpin et al. | |
| 7,716,077 B1 | 5/2010 | Mikurak | |
| 7,725,547 B2 | 5/2010 | Albertson et al. | |
| 7,770,100 B2 | 8/2010 | Chamberlain et al. | |
| 7,791,616 B2 | 9/2010 | Ioup et al. | |
| 7,805,457 B1 * | 9/2010 | Viola et al. | 707/769 |
| 7,809,703 B2 | 10/2010 | Balabhadrapatruni et al. | |
| 7,818,658 B2 | 10/2010 | Chen | |
| 7,872,647 B2 | 1/2011 | Mayer et al. | |
| 7,894,984 B2 | 2/2011 | Rasmussen et al. | |
| 7,899,611 B2 * | 3/2011 | Downs et al. | 701/117 |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,945,852 B1 | 5/2011 | Pilskalns | |
| 7,962,281 B2 | 6/2011 | Rasmussen et al. | |
| 7,962,848 B2 | 6/2011 | Bertram | |
| 7,970,240 B1 * | 6/2011 | Chao et al. | 382/305 |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,010,886 B2 | 8/2011 | Gusmorino et al. | |
| 8,015,487 B2 | 9/2011 | Roy et al. | |
| 8,019,709 B2 | 9/2011 | Norton et al. | |
| 8,024,778 B2 | 9/2011 | Cash et al. | |
| 8,036,632 B1 * | 10/2011 | Cona et al. | 455/404.1 |
| 8,065,080 B2 | 11/2011 | Koch | |
| 8,082,172 B2 | 12/2011 | Chao et al. | |
| 8,085,268 B2 | 12/2011 | Carrino et al. | |
| 8,103,543 B1 | 1/2012 | Zwicky | |
| 8,134,457 B2 * | 3/2012 | Velipasalar et al. | 340/506 |
| 8,145,703 B2 | 3/2012 | Frishert et al. | |
| 8,214,361 B1 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,280,880 B1 | 10/2012 | Aymeloglu et al. | |
| 8,290,942 B2 | 10/2012 | Jones et al. | |
| 8,301,464 B1 | 10/2012 | Cave et al. | |
| 8,312,367 B2 | 11/2012 | Foster | |
| 8,325,178 B1 | 12/2012 | Doyle, Jr. | |
| 8,352,881 B2 | 1/2013 | Champion et al. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,411,046 B2 | 4/2013 | Kruzeniski et al. | |
| 8,412,707 B1 | 4/2013 | Mianji | |
| 8,422,825 B1 | 4/2013 | Neophytou et al. | |
| 8,447,722 B1 | 5/2013 | Ahuja et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,514,082 B2 | 8/2013 | Cova et al. | |
| 8,514,229 B2 | 8/2013 | Cervelli et al. | |
| 8,515,207 B2 | 8/2013 | Chau | |
| 8,554,579 B2 | 10/2013 | Tribble et al. | |
| 8,564,596 B2 | 10/2013 | Carrino et al. | |
| 8,577,911 B1 | 11/2013 | Stepinski et al. | |
| 8,589,273 B2 | 11/2013 | Creeden et al. | |
| 8,620,641 B2 | 12/2013 | Farnsworth et al. | |
| 8,676,597 B2 | 3/2014 | Buehler et al. | |
| 8,689,108 B1 | 4/2014 | Duffield et al. | |
| 8,707,185 B2 | 4/2014 | Robinson et al. | |
| 8,713,467 B1 | 4/2014 | Goldenberg et al. | |
| 8,739,278 B2 | 5/2014 | Varghese | |
| 8,742,934 B1 * | 6/2014 | Sarpy et al. | 340/573.1 |
| 8,745,516 B2 | 6/2014 | Mason et al. | |

(56) References Cited

U.S. PATENT DOCUMENTS

| | | |
|---|---|---|
| 8,756,224 B2 | 6/2014 | Dassa et al. |
| 8,781,169 B2* | 7/2014 | Jackson et al. ............... 382/104 |
| 8,799,799 B1 | 8/2014 | Cervelli et al. |
| 8,799,812 B2 | 8/2014 | Parker |
| 8,812,960 B1 | 8/2014 | Sun et al. |
| 8,830,322 B2* | 9/2014 | Nerayoff et al. ............. 348/148 |
| 8,832,594 B1 | 9/2014 | Thompson et al. |
| 8,868,486 B2 | 10/2014 | Tamayo |
| 2001/0021936 A1 | 9/2001 | Bertram |
| 2002/0003539 A1 | 1/2002 | Abe |
| 2002/0033848 A1* | 3/2002 | Sciammarella et al. ...... 345/838 |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130867 A1 | 9/2002 | Yang et al. |
| 2002/0130907 A1 | 9/2002 | Chi et al. |
| 2002/0174201 A1 | 11/2002 | Ramer et al. |
| 2003/0039948 A1 | 2/2003 | Donahue |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0143602 A1* | 7/2004 | Ruiz et al. ................. 707/104.1 |
| 2004/0181554 A1 | 9/2004 | Heckerman et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0086207 A1 | 4/2005 | Heuer et al. |
| 2005/0125715 A1 | 6/2005 | Franco et al. |
| 2005/0162523 A1* | 7/2005 | Darrell et al. ............... 348/211.2 |
| 2005/0180330 A1 | 8/2005 | Shapiro |
| 2005/0182502 A1 | 8/2005 | Iyengar |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0203337 A1 | 9/2006 | White |
| 2006/0241974 A1 | 10/2006 | Chao et al. |
| 2006/0251307 A1 | 11/2006 | Florin et al. |
| 2006/0271277 A1 | 11/2006 | Hu et al. |
| 2006/0279630 A1* | 12/2006 | Aggarwal et al. ............. 348/143 |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0038962 A1 | 2/2007 | Fuchs et al. |
| 2007/0057966 A1* | 3/2007 | Ohno et al. ................... 345/619 |
| 2007/0078832 A1 | 4/2007 | Ott et al. |
| 2007/0188516 A1 | 8/2007 | Loup et al. |
| 2007/0192265 A1 | 8/2007 | Chopin et al. |
| 2007/0208497 A1* | 9/2007 | Downs et al. ................. 701/117 |
| 2007/0208498 A1* | 9/2007 | Barker et al. ................. 701/117 |
| 2007/0258642 A1 | 11/2007 | Thota |
| 2007/0266336 A1 | 11/2007 | Nojima et al. |
| 2007/0294643 A1 | 12/2007 | Kyle |
| 2008/0010605 A1 | 1/2008 | Frank |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0126951 A1 | 5/2008 | Sood et al. |
| 2008/0162616 A1 | 7/2008 | Gross et al. |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0223834 A1 | 9/2008 | Griffiths et al. |
| 2008/0255973 A1 | 10/2008 | El Wade et al. |
| 2008/0263468 A1 | 10/2008 | Cappione et al. |
| 2008/0267107 A1* | 10/2008 | Rosenberg ..................... 370/312 |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0002492 A1* | 1/2009 | Velipasalar et al. ........... 348/152 |
| 2009/0027418 A1 | 1/2009 | Maru et al. |
| 2009/0030915 A1 | 1/2009 | Winter et al. |
| 2009/0076845 A1 | 3/2009 | Bellin et al. |
| 2009/0088964 A1* | 4/2009 | Schaaf et al. ................. 701/200 |
| 2009/0100018 A1 | 4/2009 | Roberts |
| 2009/0115786 A1 | 5/2009 | Shimasaki et al. |
| 2009/0119309 A1 | 5/2009 | Gibson et al. |
| 2009/0125369 A1 | 5/2009 | Kloostra et al. |
| 2009/0132921 A1* | 5/2009 | Hwangbo et al. ............. 715/716 |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1* | 7/2009 | Decherd et al. ............... 715/207 |
| 2009/0179892 A1* | 7/2009 | Tsuda et al. .................. 345/419 |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0076968 A1 | 3/2010 | Boyns et al. |
| 2010/0106420 A1 | 4/2010 | Mattikalli et al. |
| 2010/0122152 A1 | 5/2010 | Chamberlain et al. |
| 2010/0131457 A1 | 5/2010 | Heimendinger |
| 2010/0162176 A1* | 6/2010 | Dunton ......................... 715/862 |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325581 A1 | 12/2010 | Finkelstein et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0117878 A1* | 5/2011 | Barash et al. ................. 455/404.2 |
| 2011/0119100 A1 | 5/2011 | Ruhl et al. |
| 2011/0137766 A1* | 6/2011 | Rasmussen et al. ............. 705/30 |
| 2011/0153384 A1 | 6/2011 | Horne et al. |

(56) References Cited

U.S. PATENT DOCUMENTS

| | | |
|---|---|---|
| 2011/0167105 A1 | 7/2011 | Ramakrishnan et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1* | 9/2011 | Edwards et al. ............... 707/780 |
| 2011/0291851 A1 | 12/2011 | Whisenant |
| 2011/0310005 A1 | 12/2011 | Chen et al. |
| 2012/0019559 A1 | 1/2012 | Siler et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0106801 A1* | 5/2012 | Jackson ......................... 382/105 |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0206469 A1 | 8/2012 | Hulubei et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0246148 A1 | 9/2012 | Dror |
| 2012/0290879 A1 | 11/2012 | Shibuya et al. |
| 2012/0323888 A1 | 12/2012 | Osann, Jr. |
| 2012/0330973 A1 | 12/2012 | Ghuneim et al. |
| 2013/0006725 A1* | 1/2013 | Simanek et al. ................ 705/13 |
| 2013/0021445 A1 | 1/2013 | Cossette-Pacheco et al. |
| 2013/0046842 A1 | 2/2013 | Muntz et al. |
| 2013/0060786 A1* | 3/2013 | Serrano et al. ................ 707/749 |
| 2013/0061169 A1 | 3/2013 | Pearcy et al. |
| 2013/0073377 A1 | 3/2013 | Heath |
| 2013/0076732 A1 | 3/2013 | Cervelli et al. |
| 2013/0078943 A1 | 3/2013 | Biage et al. |
| 2013/0097482 A1 | 4/2013 | Marantz et al. |
| 2013/0100134 A1 | 4/2013 | Cervelli et al. |
| 2013/0101159 A1* | 4/2013 | Chao et al. .................... 382/103 |
| 2013/0111320 A1 | 5/2013 | Campbell et al. |
| 2013/0117651 A1 | 5/2013 | Waldman et al. |
| 2013/0150004 A1* | 6/2013 | Rosen ........................ 455/414.1 |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0246170 A1 | 9/2013 | Gross et al. |
| 2013/0262527 A1 | 10/2013 | Hunter et al. |
| 2013/0268520 A1 | 10/2013 | Fisher et al. |
| 2013/0279757 A1* | 10/2013 | Kephart ........................ 382/105 |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0267294 A1 | 9/2014 | Ma |
| 2014/0267295 A1 | 9/2014 | Sharma |
| 2014/0279824 A1 | 9/2014 | Tamayo |
| 2014/0333651 A1 | 11/2014 | Cervelli et al. |
| 2014/0337772 A1 | 11/2014 | Cervelli et al. |

FOREIGN PATENT DOCUMENTS

| | | |
|---|---|---|
| EP | 1 672 527 | 6/2006 |
| EP | 2 551 799 | 1/2013 |
| EP | 2 575 107 | 4/2013 |
| EP | 2 778 983 | 9/2014 |
| EP | 2 779 082 | 9/2014 |
| WO | WO 95/32424 | 11/1995 |
| WO | WO 00/09529 | 2/2000 |
| WO | WO 2004/057268 | 7/2004 |
| WO | WO 2005/013200 | 2/2005 |
| WO | WO 2005/104736 | 11/2005 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2011/058507 | 5/2011 |

OTHER PUBLICATIONS

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/, Jan. 2006, pp. 8.

"Andy Turner's GISRUK 2012 Notes" https://docs.google.com/document/d/1cTmxg7mVx5gd89lqblCYvCEnHA4QAivH4I4WpyPsqE4/edit?pli=1 printed Sep. 16, 2013 in 15 pages.

Barnes et al., "Viewshed Analysis", GIS-ARC/Info 2001, www.evsc.virginia.edu/~jhp7e/evsc466/student_pres/Rounds.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ghosh, P., "A Solution of Polygon Containment, Spatial Planning, and Other Related Problems Using Minkowski Operations," Computer Vision, Graphics, and Image Processing, 1990, vol. 49, pp. 1-35.

GIS-Net 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Haralick et al., "Image Analysis Using Mathematical Morphology," Pattern Analysis and Machine Intelligence, IEEE Transactions, Jul. 1987, vol. PAMI-9, No. 4, pp. 532-550.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Ipbucker, C., "Inverse Transformation for Several Pseudo-cylindrical Map Projections Using Jacobian Matrix," ICCSA 2009, Part 1 LNCS 5592, pp. 553-564.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

(56) References Cited

OTHER PUBLICATIONS

Keylines.com, "KeyLines Datasheet," Mar. 2014, http://keylines.com/wp-content/uploads/2014/03/KeyLines-datasheet.pdf downloaded May 12, 2014 in 2 pages.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," http://www-users.cs.unm.edu/~npramod/enc_pdf.pdf retrieved Jan. 28, 2010, pp. 7.
Manske, "File Saving Dialogs," http://www.mozilla.org/editor/ui_specs/FileSaveDialogs.html, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.google.com.
Map of San Jose, CA. Retrieved Oct. 2, 2013 from http://maps.bing.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Murray, C., Oracle Spatial Developer's Guide—6 Coordinate Systems (Spatial Reference Systems), http://docs.oracle.com/cd/B28359_01/appdev.111/b28400.pdf, Jun. 2009.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Open Street Map, "Amm's Diary:Unconnected ways and other data quality issues," http://www.openstreetmap.org/user/amm/diary printed Jul. 23, 2012 in 3 pages.
POI Editor, "How To: Create Your Own Points of Interest," http://www.poieditor.com/articles/how_to_create_your_own_points_of_interest/ printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", http://web.archive.org/web/20091202221925/http://www.utsa.edu/lrsg/Teaching/EES6513/08-3D.pdf printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. http://pdf.aminer.org/000/648/038/under_the_hood_of_geovrml.pdf.
Reibel et al., "Areal Interpolation of Population Counts Using Pre-classified Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," http://web.archive.org/web/20061001053327/http://sonris-www.dnr.state.la.us/gis/instruct_files/tutslide12, Printed Jan. 3, 2013 in 1 page.
Tangelder et al., "Freeform Shape Matching Using Minkowski Operations," The Netherlands, Jun. 1996, pp. 12.
VB Forums, "Buffer A Polygon," Internet Citation, http://www.vbforums.com/showthread.php?198436-Buffer-a-Polygon, Specifically Thread #1, #5 & #11 retrieved on May 2, 2013, pp. 8.
Vivid Solutions, "JTS Topology Suite: Technical Specifications," http://www.vividsolutions.com/jts/bin/JTS%20Technical%20Specs.pdf Version 1.4, 2003, pp. 36.
Wikipedia, "Ramer-Douglas-Peucker Algorithm," http://en.wikipedia.org/wiki/Ramer%E2%80%93Douglas%E2%80%93Peucker_algorithm printed Jul. 2011, pp. 3.
Wikipedia, "Douglas-Peucker-Algorithms," http://de.wikipedia.org/w/index.php?title=Douglas-Peucker-Algorithmus&oldid=91846042 printed Jul. 2011, pp. 2.
Woodbridge, Stephen, "[geos-devel] Polygon simplification," http://lists.osgeo.org/pipermail/geos-devel/2011-May/005210.html dated May 8, 2011.
Official Communication in Australian Application No. AU2010227081, dated Mar. 18, 2011.
Official Communication in Australian Application No. AU2010257305, dated Apr. 12, 2011.
Official Communication in Australian Application No. AU2010257305, dated Sep. 22, 2011.
European Search Report in European Application No. EP10195798.3, dated May 17, 2011.
European Search Report in European Application No. EP12186236.1, dated May 17, 2013.
Official Communication in New Zealand Application No. 616167 dated Oct. 10, 2013.
Current Claims in New Zealand Application No. 616167 dated Oct. 2013 in 3 pages.
"A Quick Guide to UniProtKB Swiss-Prot & TrEMBL," Sep. 2011, pp. 2.
Bluttman et al., "Excel Formulas and Functions for Dummies," 2005, Wiley Publishing, Inc., pp. 280, 284-286.
Canese et al., "Chapter 2: PubMed: The Bibliographic Database," The NCBI Handbook, Oct. 2002, pp. 1-10.
Conner, Nancy, "Google Apps: The Missing Manual," Sharing and Collaborating on Documents, May 1, 2008, pp. 93-97, 106-113 & 120-121.
Delcher et al., "Identifying Bacterial Genes and Endosymbiont DNA with Glimmer," BioInformatics, vol. 23, No. 6, 2007, pp. 673-679.
Goswami, Gautam, "Quite 'Writely' Said!" One Brick at a Time, Aug. 21, 2005, pp. 7.
Hansen et al., "Analyzing Social Media Networks with NodeXL: Insights from a Connected World", Elsevier Science, Sep. 2010, Ch. 4 & 10, pp. 53-67 & 143-164.
Kahan et al., "Annotea: An Open RDF Infrastructure for Shared WEB Annotations", Computer Networks, 2002, vol. 39, pp. 589-608.
Kitts, Paul, "Chapter 14: Genome Assembly and Annotation Process," The NCBI Handbook, Oct. 2002, pp. 1-21.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Mizrachi, Ilene, "Chapter 1: GenBank: The Nuckeotide Sequence Database," The NCBI Handbook, Oct. 2002, pp. 1-14.
Rouse, Margaret, "OLAP Cube," http://searchdatamanagement.techtarget.com/definition/OLAP-cube, Apr. 28, 2012, pp. 16.
Sigrist, et al., "Prosite, A Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
International Search Report and Written Opinion in Application No. PCT/US2009/056703, dated Mar. 15, 2010.
Official Communication in Great Britain Application No. 1319225.7 dated May 2, 2014.
Official Communication in European Application No. EP 08839003.4 dated Aug. 14, 2012.

(56) References Cited

OTHER PUBLICATIONS

Official Communication in European Application No. EP 08839003.4 dated Jun. 12, 2013.
Official Communication in European Application No. EP 14158861.6 dated Jun. 16, 2014.
Official Communication in New Zealand Application No. 622517 dated Apr. 3, 2014.
Official Communication in New Zealand Application No. 624557 dated May 14, 2014.
Official Communication in New Zealand Application No. 628585 dated Aug. 26, 2014.
Official Communication in New Zealand Application No. 628263 dated Aug. 12, 2014.
Official Communication in Great Britain Application No. 1404457.2 dated Aug. 14, 2014.
Official Communication in New Zealand Application No. 627962 dated Aug. 5, 2014.
Official Communication in New Zealand Application No. 622513 dated Apr. 3, 2014.
Official Communication in British Application No. GB1408025.3 dated Nov. 6, 2014.
Official Communication in New Zealand Application No. 628495 dated Aug. 19, 2014.
Official Communication in New Zealand Application No. 628161 dated Aug. 25, 2014.
Official Communication in New Zealand Application No. 628840 dated Aug. 28, 2014.
Palmas, et al., "An Edge-Bundling Layout for Interactive Parallel Coordinates," Proceedings of the 2014 IEEE Pacific Visualization Symposium, Mar. 2014, pp. 57-64.

* cited by examiner

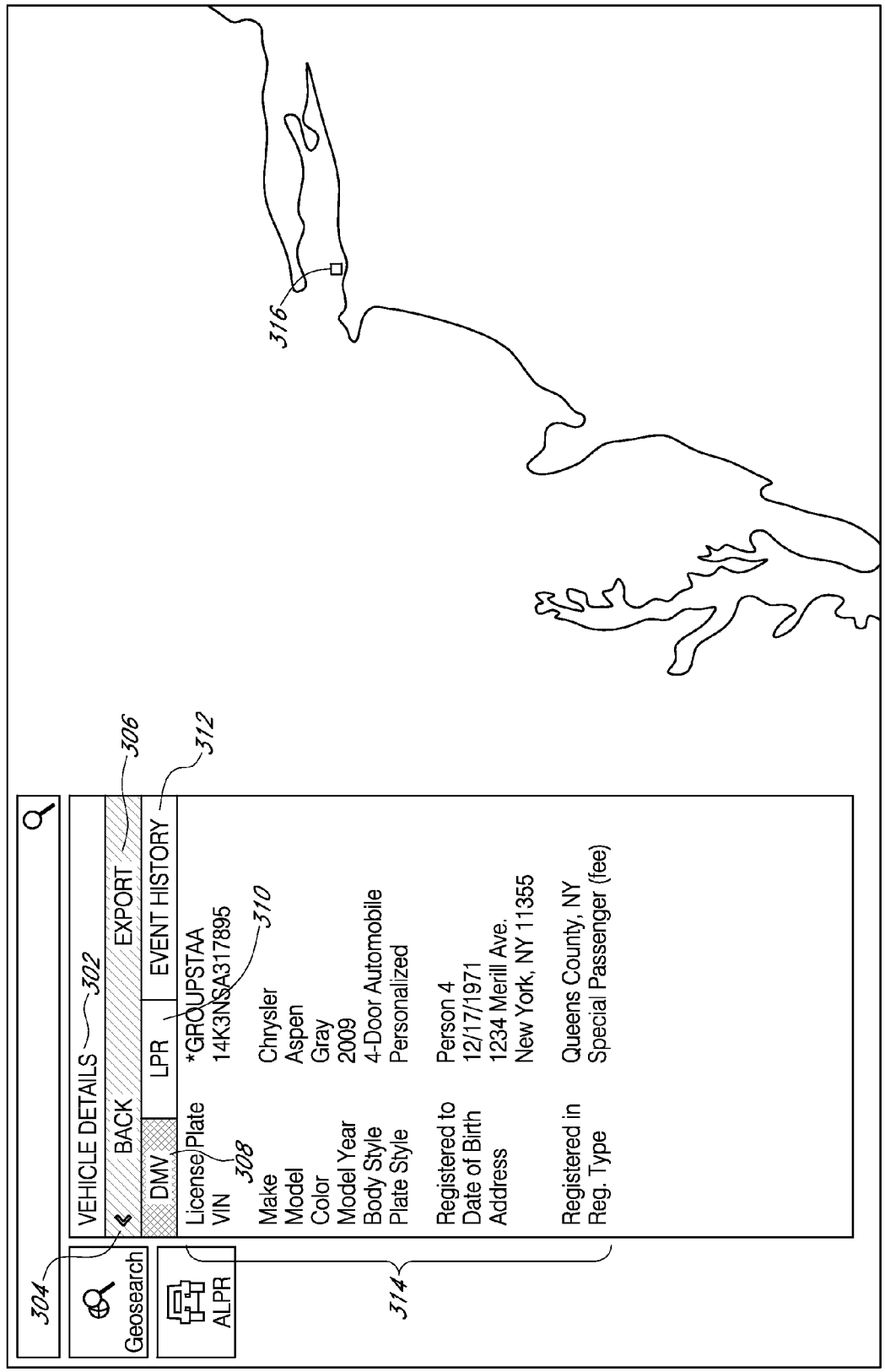

INTERACTIVE VEHICLE INFORMATION MAP

TECHNICAL FIELD

The present disclosure relates to systems and techniques for geographical data integration, analysis, and visualization. More specifically, the present disclosure relates to interactive maps including data objects and vehicle information.

BACKGROUND

Interactive geographical maps, such as web-based mapping service applications and Geographical Information Systems (GIS), are available from a number of providers. Such maps generally comprise satellite images or generic base layers overlaid by roads. Users of such systems may, for example, search for and view locations of a small number of landmarks and/or determine directions from one location to another. In some interactive graphical maps, 3D terrain and/or 3D buildings may be visible in the interface.

SUMMARY

The systems, methods, and devices described herein each have several aspects, no single one of which is solely responsible for its desirable attributes. Without limiting the scope of this disclosure, several non-limiting features will now be discussed briefly.

In various embodiments, an interactive vehicle information map system is disclosed that enables a user to efficiently search through large amounts of vehicle-related data from many disparate sources. In various embodiments, the user may, for example, specify various search criteria including time frames, geographic areas, license plate numbers, vehicle descriptions, and/or owner descriptions. Further, in various embodiments, search results may be organized into particular vehicles. In various embodiments, vehicle-related data may be plotted on an interactive map. Additionally, a user may export search results and/or initiate a search alert.

According to an embodiment, a computer system is disclosed. The computer system may comprise: one or more hardware processors configured to cause the computer system to: display an interactive map on an electronic display of the computer system; receive an input from a user of the computing system including search criteria comprising at least one of: a geographic area of interest, a time period of interest, at least part of a description of a vehicle, or at least part of an identifier of an owner of a vehicle; and in response to the input: identify, from one or more electronic data sources, one or more vehicle-related data items that satisfy the search criteria, the one or more electronic data sources including at least one of: a vehicle owner information data source, a vehicle license plate data source, a law enforcement data source, a traffic incident data source, a license-plate recognition data source, or a criminal event data source; associate each of the identified vehicle-related data items with one or more corresponding vehicles; and display information regarding one or more of the vehicles having vehicle-related data items associated therewith.

According to another embodiment, another computer system is disclosed. The computer system may comprise: one or more hardware processors configured to cause the computer system to: display an interactive map on an electronic display of the computer system; receive an input from a user of the computing system including vehicle search criteria; identify, from one or more electronic data sources, vehicle-related data satisfying the vehicle search criteria, the vehicle related data including associated metadata; associate the identified vehicle-related data with one or more corresponding vehicles; for each of the vehicles: identify, from the one or more electronic data sources, additional vehicle-related data related to respective vehicles, the additional vehicle-related data identified based on data and metadata previously associated respective vehicles; and associate the additional vehicle-related data with the one or more corresponding vehicles; and display information regarding one or more of the vehicles having vehicle-related data items associated therewith.

According to yet another embodiment, a computer-implemented method is disclosed. The computer-implemented method may comprise: under control of a computing system configured with specific computer executable instructions, displaying an interactive map on an electronic display of the computer system; receiving an input from a user of the computing system including vehicle search criteria; identifying, from one or more electronic data sources, vehicle-related data satisfying the vehicle search criteria, the vehicle related data including associated metadata; associating the identified vehicle-related data with one or more corresponding vehicles; for each of the vehicles: identifying, from the one or more electronic data sources, additional vehicle-related data related to respective vehicles, the additional vehicle-related data identified based on data and metadata previously associated respective vehicles; and associating the additional vehicle-related data with the one or more corresponding vehicles; and displaying information regarding one or more of the vehicles having vehicle-related data items associated therewith.

BRIEF DESCRIPTION OF THE DRAWINGS

The following aspects of the disclosure will become more readily appreciated as the same become better understood by reference to the following detailed description, when taken in conjunction with the accompanying drawings.

FIGS. 3A-3D illustrate sample user interfaces of the interactive vehicle information map system in which detailed vehicle and other information is displayed, according to embodiments of the present disclosure.

FIGS. 5A-5B illustrate sample user interfaces of the interactive vehicle information map system in which vehicle information is exported, according to embodiments of the present disclosure.

DETAILED DESCRIPTION OF SPECIFIC EMBODIMENTS

Overview

Figure 1:
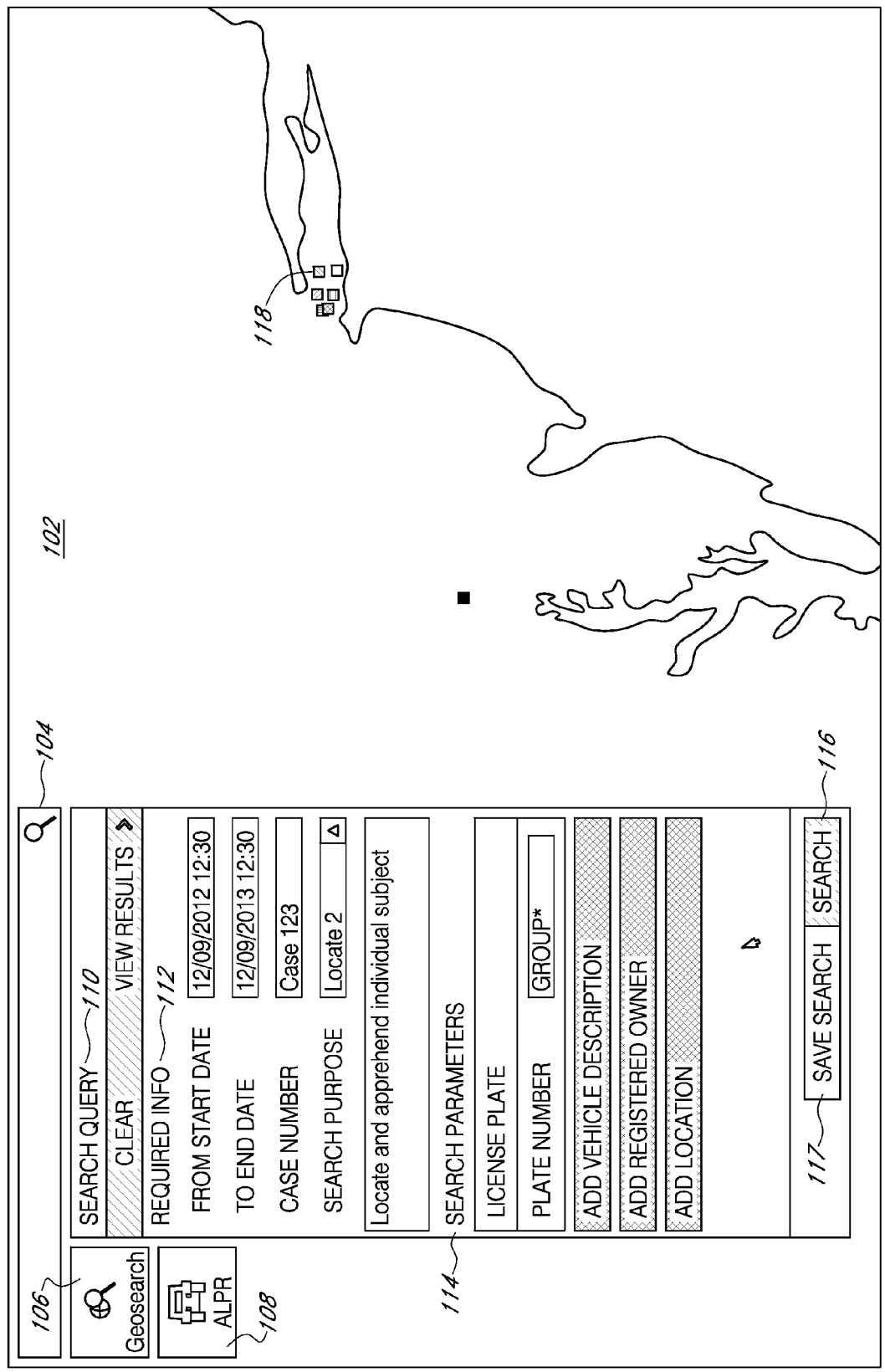
FIG. 1 illustrates a sample user interface of an interactive vehicle information map system, according to an embodiment of the present disclosure.

An interactive vehicle information map system ("map system") is disclosed in which, in various embodiments, large amounts of geographical, geospatial, vehicle, and other types of data, geodata, objects, features, and/or metadata are efficiently presented to a user on an interactive map interface. In various embodiments, the interactive vehicle information map system allows for rapid and deep searching, retrieval, and/or analysis of various vehicle-related data, objects, features, and/or metadata by the user. In an embodiment, the user may search vehicle-related data via the interactive map by providing search criteria including, for example, information regarding a geographic area, a time period, a vehicle, a vehicle owner, and/or a license plate number, among other items. The map system may provide search results including a list of vehicles that match the search criteria, vehicle information, and/or points on the interactive map that indicate license-plate recognition (LPR) read locations, among other information. In an embodiment, the user may view detailed information associated with particular vehicles including, for example, captured images, vehicle-owner data, event history, and the like.

DEFINITIONS

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: A broad term for any data structure or data store for storing and/or organizing data, including, but not limited to, relational databases (Oracle database, MySQL database, etc.), spreadsheets, XML files, and/or text files, among others.

Data Object, Object, or Feature: A data container for information representing specific things in the world that have a number of definable properties. For example, a data object can represent an entity such as a vehicle, a person, a place, an organization, a market instrument, or other noun. A data object can represent an event that happens at a point in time or for a duration. A data object may be associated with a unique identifier that uniquely identifies the data object. The object's attributes (for example, metadata about the object) may be represented in one or more properties. For the purposes of the present disclosure, the terms "event," "feature," "data object," and "object" may be used interchangeably to refer to items displayed on the map interface of the interactive vehicle information map system, and/or otherwise accessible to the user through the interactive vehicle information map system. Examples of events/objects include, but are not limited to, license-plate reads, traffic incidents (such as accidents), criminal events, law enforcement activities (for example, traffic citations), vehicles, persons (for example, vehicle owners), and the like.

Properties: Also referred to as "metadata," includes attributes of a data object/feature. At a minimum, each property/metadata of a data object has a type (such as a property type) and a value or values. Properties/metadata associated with features/objects may include any information relevant to that feature/object. Events/objects may be associated with various other events/objects, metadata and/or properties. For example, a vehicle object may be associated with various vehicle owner information, traffic incidents, license-plate reads, and the like.

Vehicle: A broad term that may, in various embodiments, refer to any of various types of machines including bicycles, automobiles (such as cars and trucks), motorcycles, boats, trains, and/or airplanes, among others.

Vehicle-Related Data: Any type of data and/or information related to a vehicle. Examples may include license-plate recognition ("LPR") data, vehicle license plate data, vehicle owner information data, vehicle incident data, criminal event data, and the like. Vehicle-related data may be obtained from a single database or multiple databases. The single and/or multiple databases from which vehicle-related data may be obtained may be operated, maintained, and/or owned by various entities. For example, vehicle-related data may be obtained from public entities, private entities, law enforcement entities, government entities (for example, a department of motor vehicles ("DMV")), LPR sources, and the like.

License-Plate Recognition ("LPR"): Also referred to as Automatic License-Plate Recognition ("ALPR"). Any process or system that uses optical character recognition on images to read vehicle registration plates (for example, vehicle license plates). For example, LPR may be accomplished by capturing a vehicle license plate with a camera mounted on a stoplight, on law enforcement vehicle, on a tow truck, or on any other type of vehicle, and/or near a road. The characters of the license plate may then be determined by optical character recognition to identify the vehicle. An image of the vehicle, an image of the license plate, the determined license plate characters, information related to the identified vehicle, information related to the registered vehicle owner, and/or any other type of information may be stored in one or more databases as part of LPR. The present disclosure may use the terms "LPR event" and/or "LPR read" interchangeably to refer to particular events in which a license plate is read by an LPR process.

DESCRIPTION OF THE FIGURES

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1 illustrates a sample user interface of the interactive vehicle information map system, according to an embodiment of the present disclosure. The user interface may include a map interface 102, a search box 104, a geosearch button/icon 106, an ALPR (Automatic License-Plate Recognition) button/icon 108, and a search query box 110. As shown, the search query box 110 may include various required information boxes 112, various search parameters 114, a search button 116, and a save search button 117. Additionally, various events/objects, such as locations of license plate reads of vehicles matching search criteria, may be represented on the map interface 102 with icons and/or symbols, such as dot 118. In various embodiments, functionality of the interactive vehicle information map system (as described in reference to FIG. 1, and FIGS. 2A-7 below) may be implemented in one or more computer modules and/or processors, as is described below with reference to FIGS. 8A-8B.

The map interface 102 of FIG. 1 may be composed of multiple map tiles. The map tiles may be composed of multiple layers of geographical, vector, and/or other types of data. Vector data layers (also referred to as vector layers) may include associated and/or linked data objects/events. In an embodiment, vector layers are composed of data objects/features. Example systems and methods for generating an interactive map interface, such as the map interface 102, may be found in U.S. patent application Ser. No. 13/917,571 (the '571 Application), filed Jun. 13, 2013, and titled "Interactive Geospatial Map," which is hereby incorporated by reference herein in its entirety and for all purposes.

In various embodiments, the user interface of FIG. 1 is displayed on an electronic display viewable by a user of the interactive vehicle information map system. The user of the interactive vehicle information map system may interact with the user interface of FIG. 1 by, for example, touching the display when the display is touch-enabled and/or using a mouse pointer to click on the various elements of the user interface.

The map interface 102 may include various highlighted events/objects and/or event/object icons. For example, the map interface 102 may include roads, buildings and structures, utilities, lakes, rivers, vegetation, and railroads, among other objects. The user may interact with the map interface 102 by, for example, rolling over and/or clicking on various objects. In one embodiment, rolling over and/or placing the mouse pointer over an object may cause the object to be outlined and/or otherwise highlighted. In the embodiment shown, various LPR events are shown in the map interface 102, each represented by colored or shaded dots (such as dot 118). In this example, the locations of the dots on the map indicate the locations of the LPR events (also referred to as LPR reads).

The user of the map system may interact with the user interface (as shown in FIG. 1) by scrolling or panning up, down, and/or side to side; zooming in or out; selecting objects; drawing shapes; selecting layers; performing a geosearch; viewing LPR data (for example, the locations of LPR reads and/or locations of LPR cameras); viewing event information (for example, criminal events, traffic events, law enforcement events, and the like); and/or viewing registered owner address locations; among other actions as are described below. Various user actions may reveal more or less map detail, and/or more or fewer events/objects.

In various embodiments, a user may provide various textual queries to the map system via the search box 104. For example, the user may search for a particular geographical location, such as a city, state, and/or zip code. Matching locations may be shown in a dropdown box, which the user may select. Selection of a search result may cause the map interface 102 to move and/or zoom to the selected location. In various embodiments, the user may use the search box 104 to search for various events/objects that may or may not be displayed on the map interface 102.

In various embodiments, the user may select the ALPR button 108 to cause, for example, the map system to display various LPR events on the map interface 102 (for example, dot 118). For example, in an embodiment the user may select the ALPR button 108 and, in response, the map system may display any available LPR events on a currently visible portion of the map shown in the map interface 102. In another embodiment, the ALPR button 108 button may be used to toggle display of LPR events on the map interface 102. In an embodiment, the user may select the ALPR button 108 to reveal the search query box 110.

In various embodiments, the user may select the geosearch button 106 to perform a geosearch and/or to reveal the search query box 110. In various embodiments, the term "geosearch" may refer to searches performed via the map system in which a particular geographic area and/or location of interest is defined. Providing a geographic area as a search criterion is described in detail below in reference to FIGS. 4A-4D. In an embodiment, selection of the geosearch button 106 may cause a user interface to be displayed in which the user may provide an address and/or draw a location on the map interface, as described below in reference to FIG. 4A. The geosearch may also be filtered using various vehicle-related attributes, such as those discussed below.

In various embodiments, the example user interface of FIG. 1 (in addition to the example user interfaces of FIGS. 2A-4D described below) may or may not include various of the buttons, icons, and/or other aspects shown. For example, in an embodiment the user interface of FIG. 1 may not include the geosearch button 106 and/or the ALPR button 108. Rather, the user may, for example, directly view and/or access the search query box 110.

The user may use the search query box 110 to perform various searches of vehicle-related data. For example, the user may provide various items of search criteria including, for example, information regarding a geographic area, a time period, a vehicle, a vehicle owner, and/or a license plate number, among other items. In an embodiment, under required information 112, the user may provide a time period of interest (including a start and end date/time). By providing a start and end date, the user may limit the search of vehicle-related data to a specific time period of interest. For example, the user may be investigating a robbery that occurred on Mar. 1, 2013, at 3:00 PM. Accordingly, the user may limit the search of vehicle-related data to Mar. 1, 2013, between 2:00 PM and 4:00 PM, so as to limit the search to the most relevant information and/or time period. In an embodiment, time period information may be required to perform a search via the search query box 110. In another, embodiment, time period information may not be required to perform a search via the search query box 110.

In various embodiments, the user may also provide information related to the search being performed, for example, the user may provide a case number (or other search name), and/or a search purpose. The case number, search purpose, and/or other information related to the search may be used to identify the search for future retrieval, auditing, export, and/or alerts, as described below.

Additionally, in various embodiments, the user may provide various search parameters by entering information into text boxes under search parameters 114. For example, the user may provide whole and/or partial information related to any of a license plate number, a vehicle description, a registered owner, and/or a geographical location. Multiple types of information may be provided in the same search. For example, the user may provide part of a vehicle description and a geographical location and/or a license plate number. As shown in FIG. 1, the user has provided part of a license plate number: "GROUP*". In an embodiment, an asterisk ("*") may indicate one or more wildcard characters (in other embodiments, the wildcard operator may be assumed for a search without specific inclusion of a wildcard character). Thus, for example, a search for "GROUP*" may match any license plates beginning with "GROUP", for example, "GROUPA", "GROUPYYY", and the like.

In an embodiment, the user may select the search button 116 and/or the "VIEW RESULTS" button to perform the specified search. In an embodiment, the user may select the "CLEAR" button to clear the provided search criteria.

In an embodiment, the user may select the save search button 117 to save the search and/or generate a search alert. For example, in an embodiment the user may provide search criteria (as described above), perform a search (by, for example, pressing the search button 116) to verify the results of the search meet the user's needs, and then select the save search button 117. Selection of the save search button 117 may, in an embodiment, save the provided search criteria such that a future search may be easily initiated by the user by, for example, selecting the saved search from a list.

In another embodiment, selection of the save search button 117 may initiate a search alert. A search alert may include a periodic re-running of the specified search (using the provided search criteria) and delivery of search results to the user. In an embodiment, the user may indicate the frequency with which the saved search is to be run. In an embodiment, the user may specify how search results are to be delivered. For example, the user may specify an email address. Alternatively, search alert results may be provided as a pop up window in the user interface of the map system, and/or by any other delivery method. In an embodiment, only new search results may be delivered to the user. For example, the user may initiate a search alert for a particular license plate number, in a particular area, for any time period. Subsequent to the initial search, when any new LPR read of the specified license plate number in the specified area (and/or satisfying other search criteria) is found by the system, the user may be notified via a search alert.

In an embodiment, the system may include a user interface through which the user may modify and/or view saved searches, and/or create new saved searches. For example, the user interface of FIG. 1 may including a "Manage Alerts" and/or "Manage Searches" button that may be selected by the user to modify and/or view saved searches, and/or create new saved searches. In another example, selection of the save search button 117 may, in an embodiment, cause a user interface to be provided to the user through which the user may modify and/or view saved searches, and/or create new saved searches. In various embodiments, a "Manage Alerts" user interface may include a listing of various saved searches/alerts of the user. Additionally, the "Manage Alerts" user interface may include a listing of various saved searches/alerts of a team, and or teams, of users with which the user is associated. In an embodiment, the user may select a particular search/alert to view, for example, various criteria/parameters associated with the search/alert, a number (and or listing of) results associated with the search/alert, an email address (or other notification method) associated with the search/alerts, and/or the like. In an example, the user may modify, edit, add to, and/or delete any of the various displayed items of information associated with a search/alert. Further, in an embodiment the user may delete particular searches/alerts and/or create new searches/alerts.

Figure 2A:
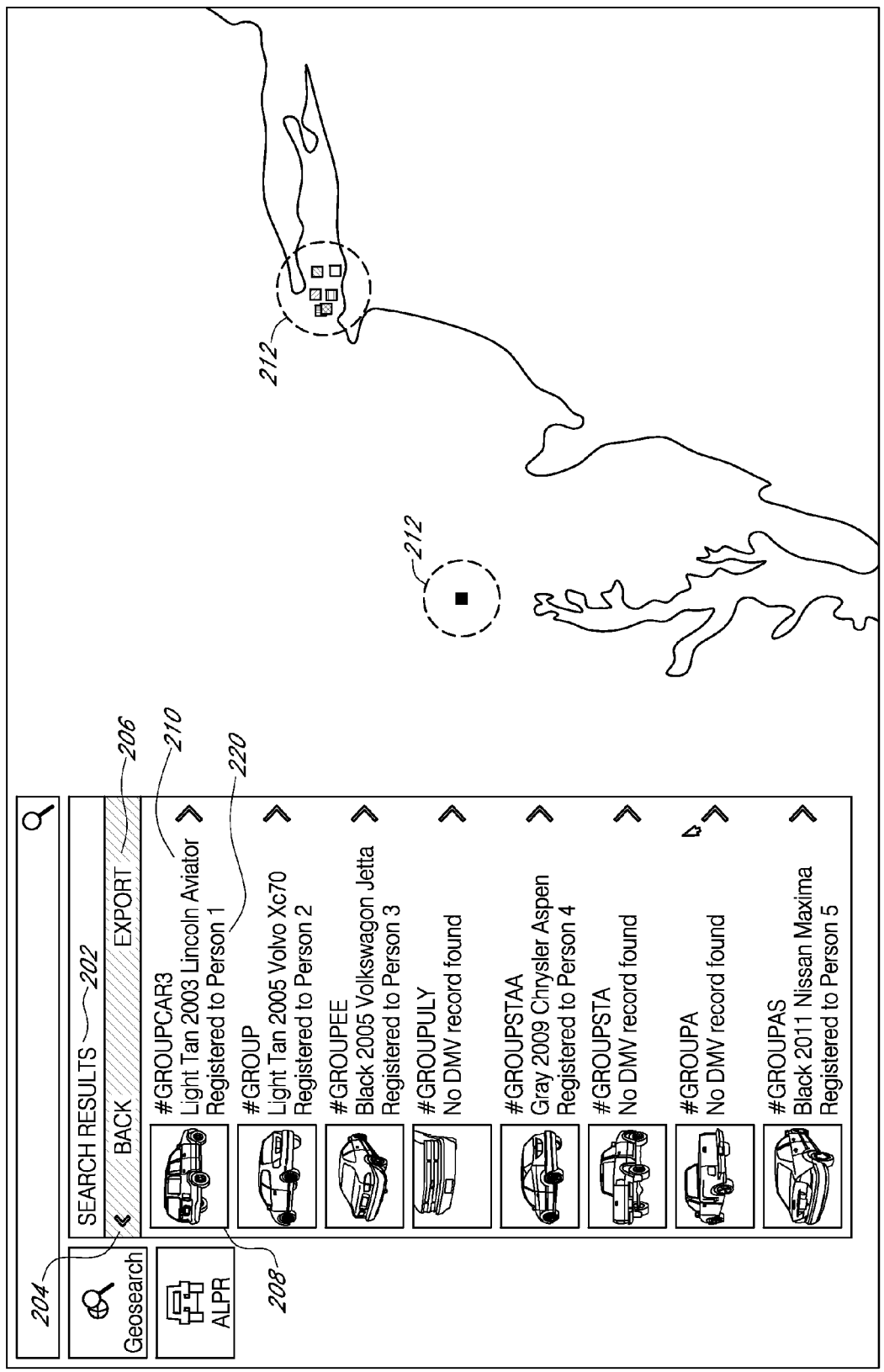
FIGS. 2A-2B illustrate sample user interfaces of the interactive vehicle information map system in which a search is performed and results are displayed, according to embodiments of the present disclosure.
Figure 2B:
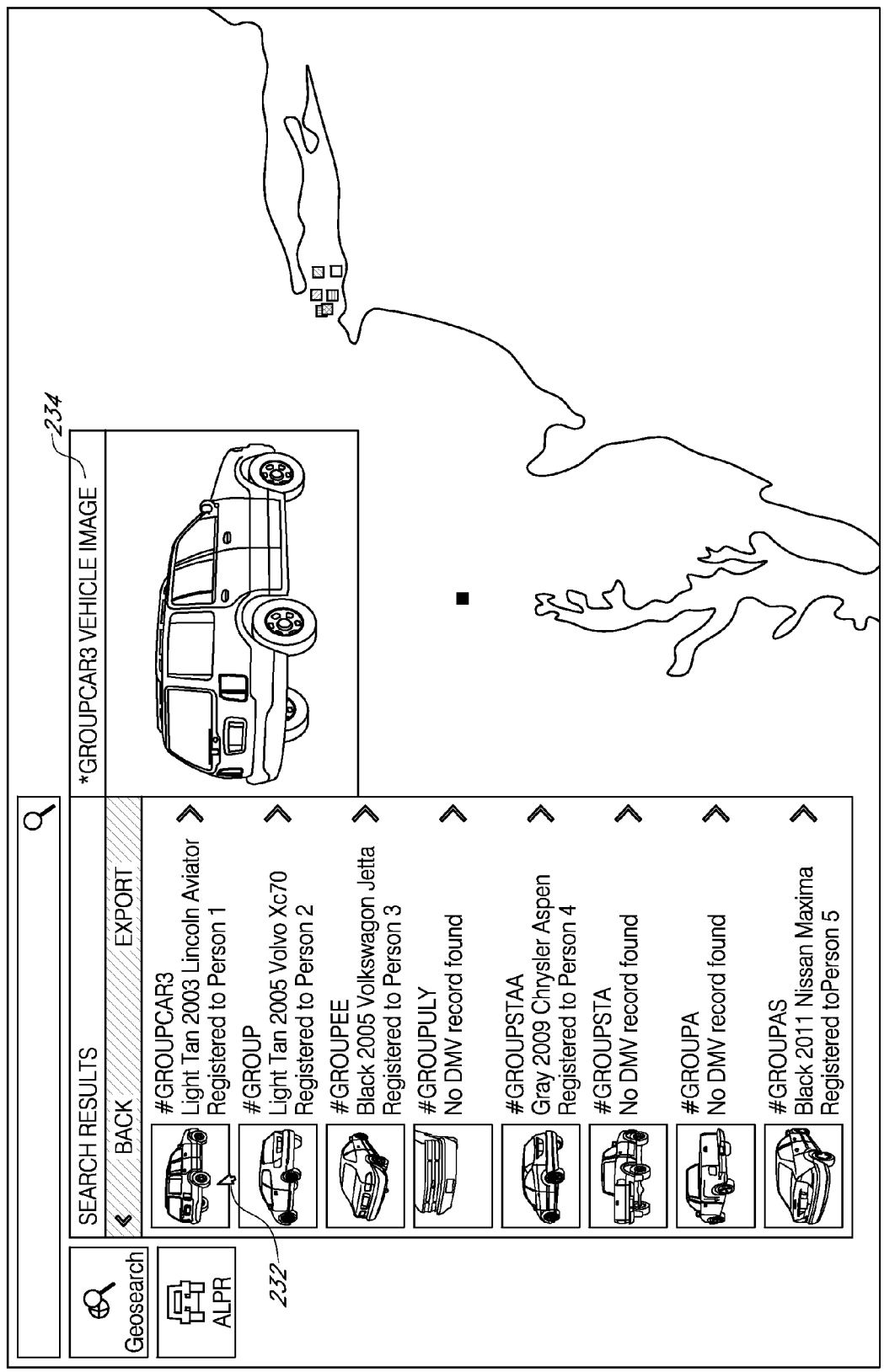

FIGS. 2A-2B illustrate sample user interfaces of the interactive vehicle information map system in which a search (for example, based on the search criteria of FIG. 1) is performed and results are displayed, according to embodiments of the present disclosure. In reference to FIG. 2A, in response to a search (and/or a geosearch), a list of search results 202 and/or associated events/objects 212 may be shown. In various embodiments, a user may select a back button 204 to return to the search query box (as shown in FIG. 1) to, for example, modify the search criteria. Additionally, the user may select the export button 206 to export the search results to another format (for example, a printable format). For example, the user may select the export button 206 to export various vehicle-related data associated with the various vehicles listed in the search results box 202.

As shown, in an embodiment the search results box 202 may include various vehicles that may be identified by the map system as having vehicle-related data that satisfy the search criteria. For example, in an embodiment the map system may search any available vehicle-related data to identify data satisfying the provided search criteria. Then, the identified vehicle-related data may be analyzed by the map system to determine vehicles with which the data is associated. Next, the determined vehicles may be listed in the search results box 202, including various items of related data. In an embodiment, multiple items of identified vehicle-related data that satisfy the search criteria may be related to the same vehicle. For example, multiple LPR event (also referred to as LPR reads) may be available for the same vehicle. In this example, each of the related LPR events, and associated vehicle data, would be aggregated and displayed as a single vehicle in the search results box 202. This process is further described in reference to FIG. 6 below.

Various vehicles having vehicle-related data meeting the search criteria may be displayed in a list, as shown in FIG. 2A. In various embodiments, each listed vehicle may include, for example, a photo (which, in an embodiment, may be obtained from an LPR or other data source) (for example, photo 208), a license plate number, a description of the vehicle, and/or a description or name of a registered owner (for example, as indicated by 210). In an embodiment, in response to the user selecting and/or hovering a cursor over one of the listed vehicles, particular events/objects 212 associated with the vehicle may be highlighted and/or displayed (for example, as described below in reference to FIGS. 3A-3D). Similarly, in an embodiment, the user may select and/or hover a cursor over any of the displayed event/objects 212 to cause an associated vehicle to be highlighted in the search results list 202. In an embodiment, the user may select a particular item of information, for example, "Person 1" (as indicated by 220), to view additional information related to that particular item (for example, various data related to Person 1, as described in reference to FIG. 3D below). In an embodiment, the user may select and/or hover a cursor over any of the displayed event/objects 212 to cause a pop up with related vehicle, object, and/or event information to be displayed. In various embodiments, the user may select multiple events/objects in the map interface.

In an embodiment, a save search button, similar to the save search button 117 described above in reference to FIG. 1, may be included in the search results box 202. For example, a save search button may be included above or below the information associated with the various vehicle search results. In another example, the save search button may be included next to the export button 206. In various embodiments, selecting the save search button causes the system to save the search and/or generate a search alert (as described above in reference to FIG. 1) associated with the currently displayed search results. For example, selecting the save search button while viewing the search results of FIG. 2A may cause the system to save (and/or generate a search alert related to) the search criteria (for example, the search for plate numbers starting with "GROUP") and/or results currently displayed.

Referring to FIG. 2B, in an embodiment the user may select and/or hover a cursor over any of the listed vehicles and/or vehicle photos (as shown at indicator 232) to cause the map system to display an enlarged photo of the vehicle (as shown at 234). In various embodiments, multiple LPR reads may be available to the map system for displaying photos as shown in FIGS. 2A-2B. In these embodiments, the map system may determine a particular photo to display to the user by default based on image selection rules. For example, the system may select a LPR photo/image of the vehicle that is within a certain time period and/or having a particular OCR quality. For example, a photo that was taken within a particular time period, for example, within the last year (such that, for example, the photo is not so old that the representation of the vehicle is no longer accurate) may be preferred over older photos. Also, a photo that has a high OCR quality, such as a confidence level that characters in the image are correct, may be preferred over other images with lower OCR qualities. In an embodiment, the map system may also determine that a photo taken in the middle of the day (when the sun is brightest) is preferable to a photo taken, for example, at night. Thus, images may be selected for display based on time of day when taken. In some embodiments, the map system may further determine a quality level of the camera that obtained the photo, and select a photo produced by a higher quality camera. In various embodiments, the user may select any of the listed vehicles to view additional vehicle-related data associated with the selected vehicle, as is described in reference to FIGS. 3A-3D below.

FIGS. 3A-3D illustrate sample user interfaces of the interactive vehicle information map system in which detailed vehicle and/or other information is displayed, according to embodiments of the present disclosure.

Referring to FIG. 3A, a vehicle details box 302 is shown. A back button 304 may be selected by the user to return to the list of vehicles (as shown in FIGS. 2A-2B), and an export button 206 may be selected by the user to export vehicle-related data associated with the selected vehicle. The vehicle details box 302 also may include three buttons that may be selected by the user to display various vehicle-related data associated with the selected vehicle, including a DMV button 308, an LPR button 310, and an event history button 312. FIG. 3A shows the DMV button 308 selected by the user such that vehicle-related data, including vehicle and/or owner information may be displayed as indicated at 314. Information 314 may be received, in various embodiments, from a DMV database and/or other government, private, and/or public database. Additionally, in an embodiment, events/objects associated with the selected vehicle are shown in the map interface, as indicated by displayed object 316.

Figure 3B:
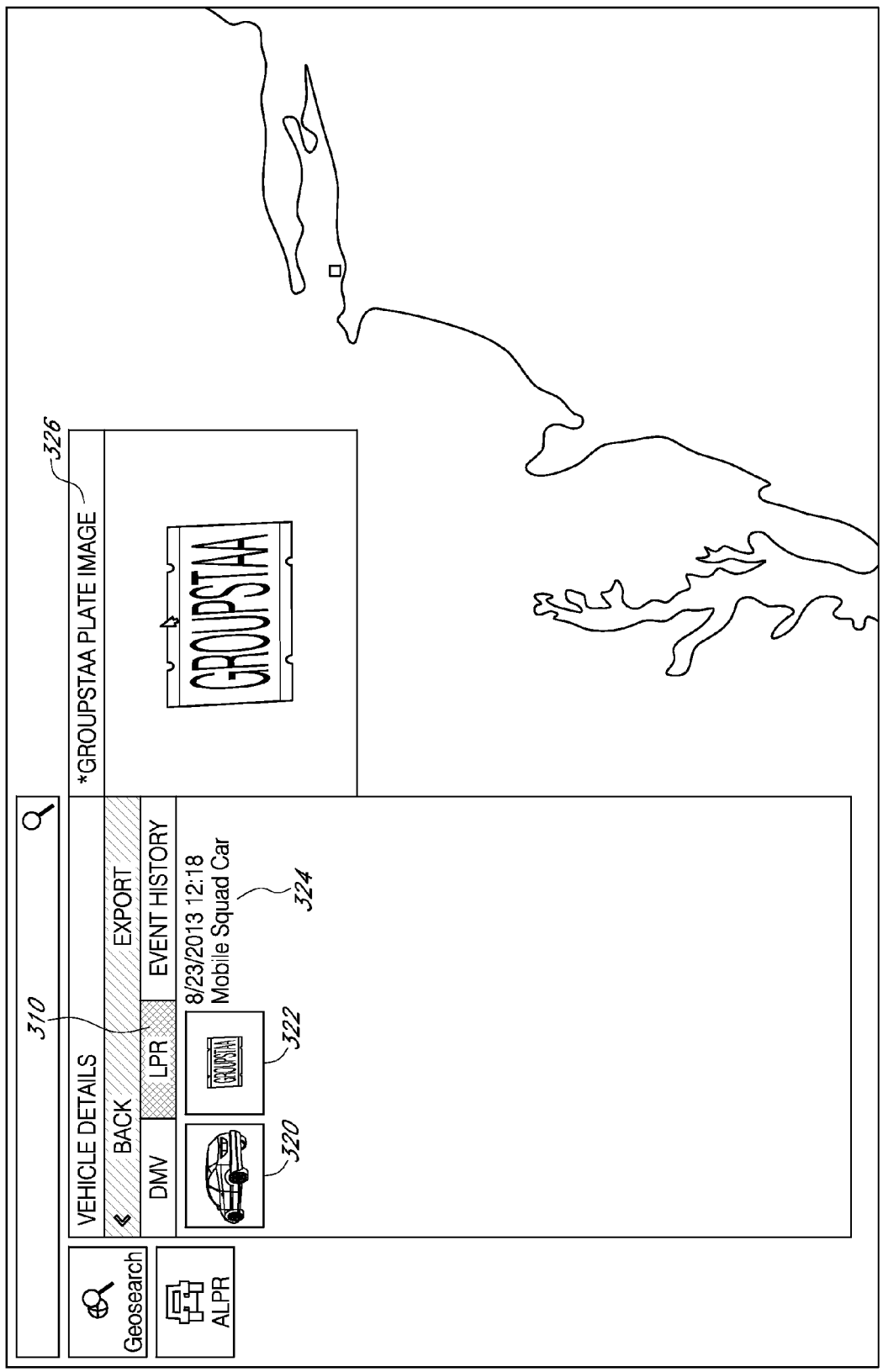

Referring to FIG. 3B, a vehicle details box is shown in which the user has selected the LPR button 310. As shown, in an embodiment selection of the LPR button 310 causes display of various LPR-related information, including a vehicle photo 320, a license plate photo 322, and LPR data 324. In an embodiment, the LPR-related information may include multiple LPR reads, however one such read is shown in FIG. 3B for illustrative purposes. In an embodiment, LPR data 324 may indicate the time of the LPR read and/or the source of the LPR read/data (in this example, a law enforcement squad car). In an embodiment, selecting and/or hovering a cursor over one of the LPR-related information items may cause an associated event/object in the map interface to be displayed and/or highlighted. Similarly, selecting and/or hovering a cursor over an event/object in the map interface may cause an associated LPR-item in the vehicle details box to be highlighted. In an embodiment, selecting and/or hovering a cursor over an image in the vehicle details box may cause a more detailed view to be displayed, as shown with image 326. In various embodiments, LPR information may be obtained from various private and/or other government and/or public databases.

Figure 3C:
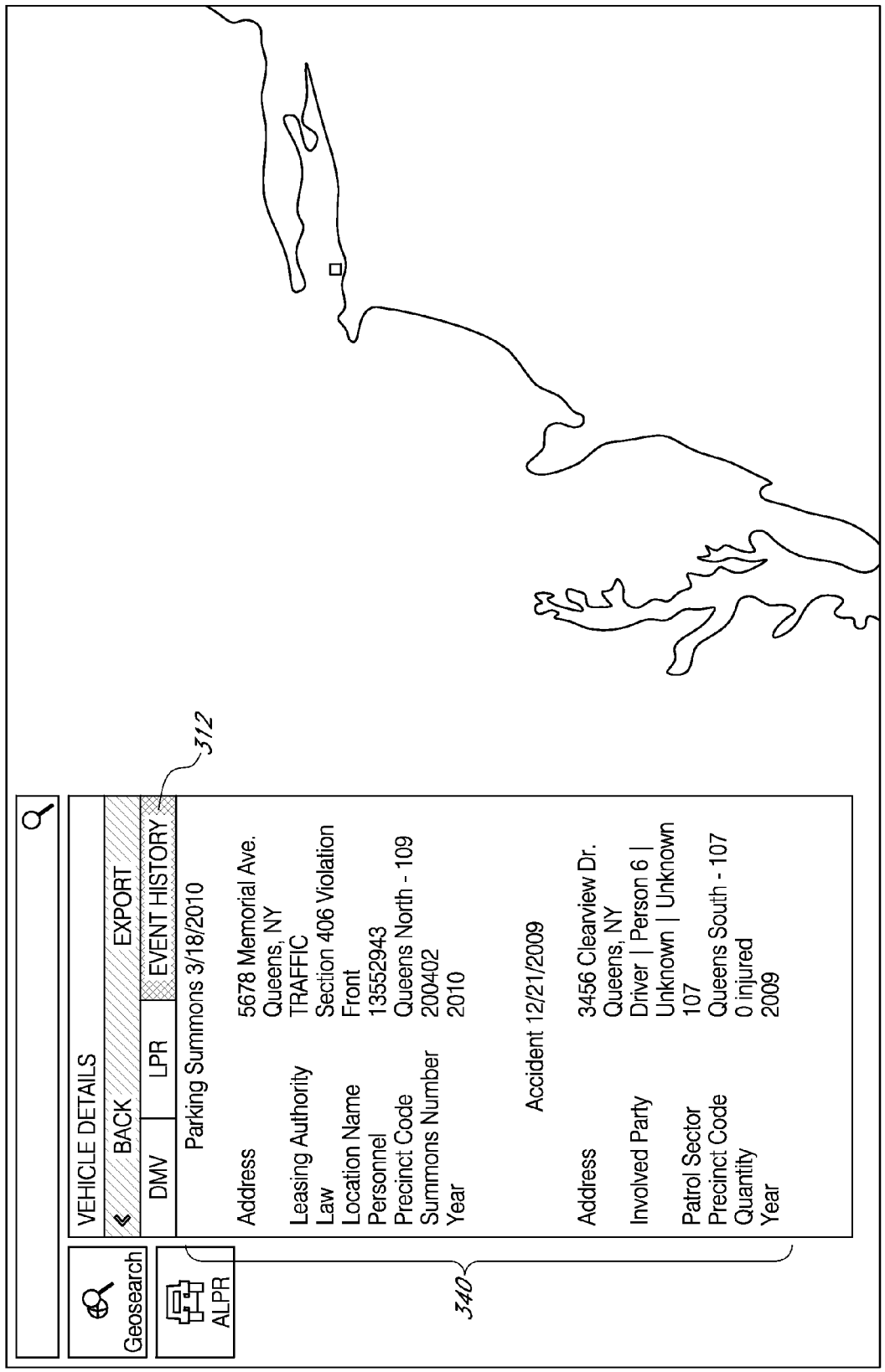

Referring to FIG. 3C, a vehicle details box is shown in which the user has selected the event history button 312. As shown, in an embodiment selection of the event history button 312 causes display of various event information (for example, a parking summons and an accident as shown at 340). Event information may include, for example, traffic incidents (such as accidents), criminal events, law enforcement activities (for example, traffic citations), and the like. In various embodiments, event history information may be obtained from various private and/or other government and/or public databases.

Figure 3D:
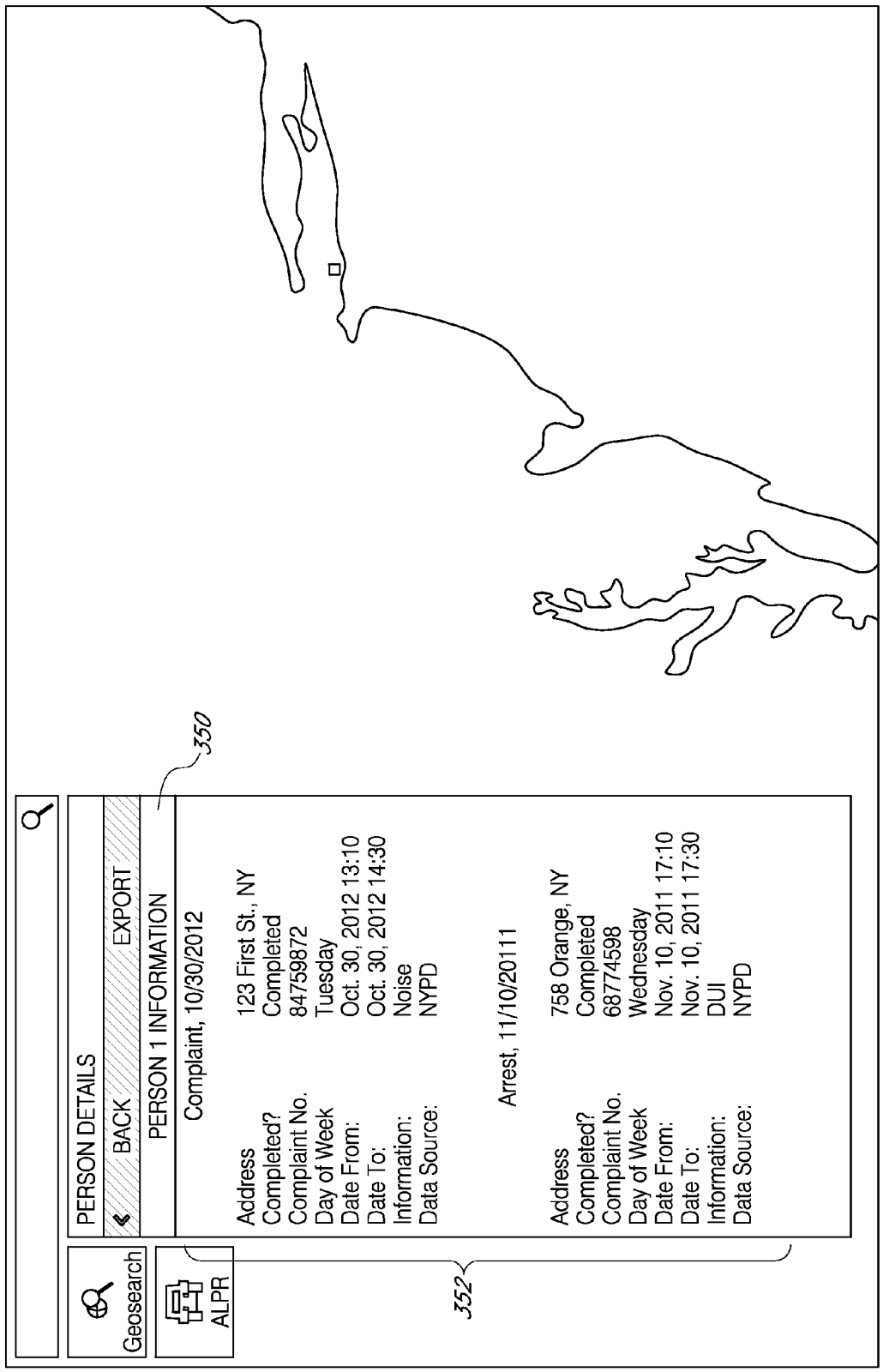

Referring to FIG. 3D, a person details box is shown in which the user has select to view information and data related to an individual ("Person 1," as indicated at 350). In an embodiment, the user may view information and data related to a person by selecting, for example, a name of the person displayed in the user interface of the map system (for example, the Person 1 shown at 220 of FIG. 2A). As shown, in an embodiment selection of a person causes display of various information and data related to the person, including for example, law enforcement and criminal information 352. Information and data related to a person that may be displayed may include, for example, traffic incidents (such as accidents), criminal events, law enforcement activities (for example, traffic citations), property ownership, demographic information, and the like. In various embodiments, the user may select to view various information and data related to, for example, persons, vehicles, events or incidents (for example, criminal events), among other objects and/or items. In various embodiments, information and data related to any of the objects and items mentioned above may include displaying those objects and/or items at particular related locations on the map interface of the map system. In various embodiments, as described below in reference to FIG. 6, data and information related to various objects and/or items may be accessed from various databases internal and/or external to the map system, including various private, public, and/or government databases.

In various embodiments, a user of the interactive vehicle information map system may view, in addition to ALPR data, various other items of information in the map interface. For example, a user may view locations of events associated with law enforcement activities, traffic incidents (such as parking tickets, moving violations, and the like), criminal activities (such as arrests, and the list), LPR camera locations, and/or the like (such as emergency calls, and the like). In another example, the user may view locations of registered owner addresses. In various embodiments, the various items of information shown on the map interface (including, for example, LPR reads, LPR camera locations, criminal events, traffic events, law enforcement events, registered owner addresses, and the like) may be indicated by particular icons. For example, a registered owner address may be indicated by a house icon, a traffic event may be indicated by a vehicle icon, and/or an LPR camera location may be indicated by a camera icon. In various embodiments, the user may selectively view, in the map interface, one or more of the items of information mentioned above. Further, the user may view items of information associated with particular selected vehicles, persons, search results, and/or the like. In an embodiment, the map system may display the locations of fixed LPR cameras and/or mobile LPR camera for a given time period, for example.

Figure 4A:
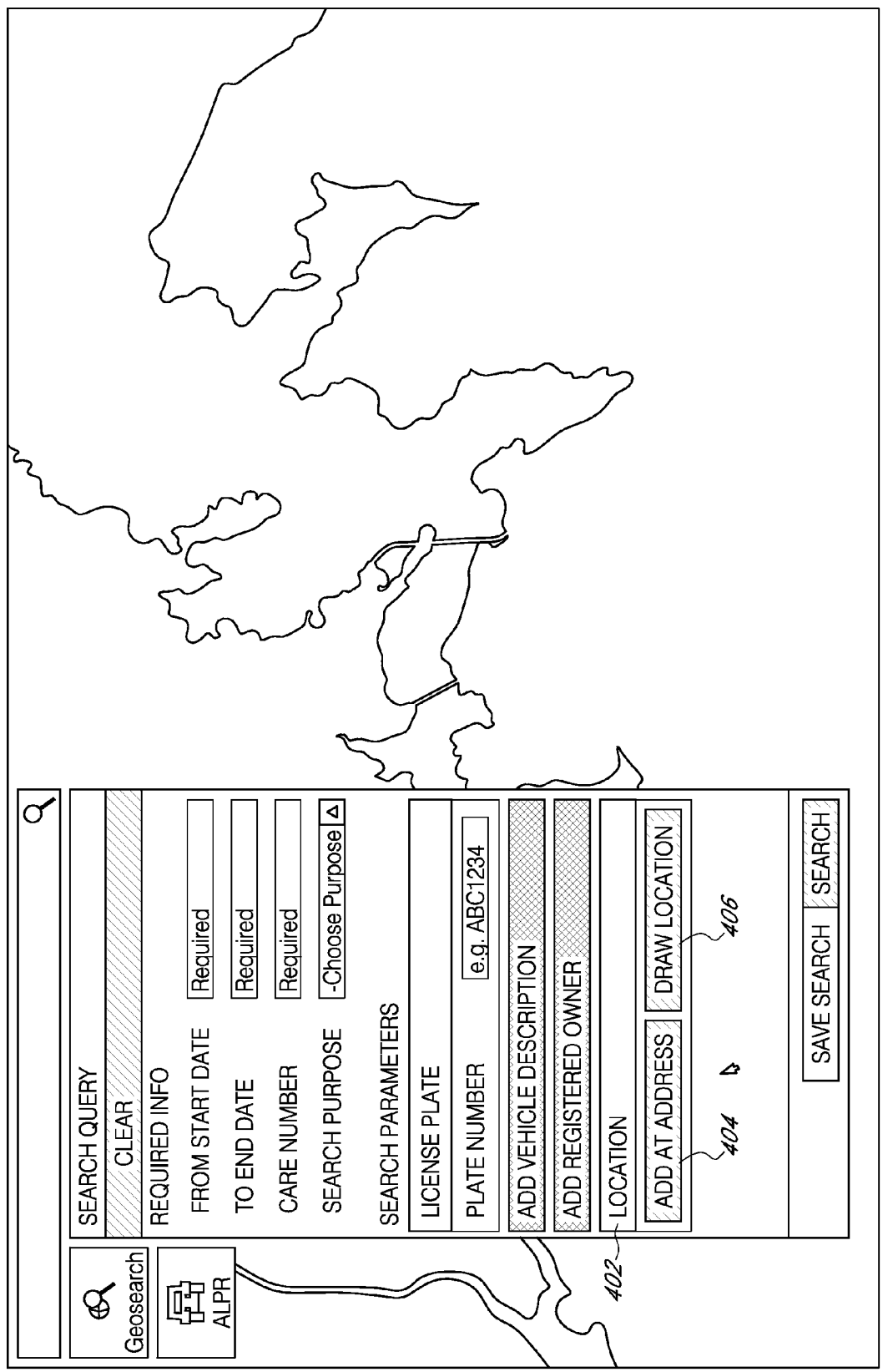
FIGS. 4A-4D illustrate sample user interfaces of the interactive vehicle information map system in which additional searching is performed and results are displayed, according to embodiments of the present disclosure.
Figure 4B:
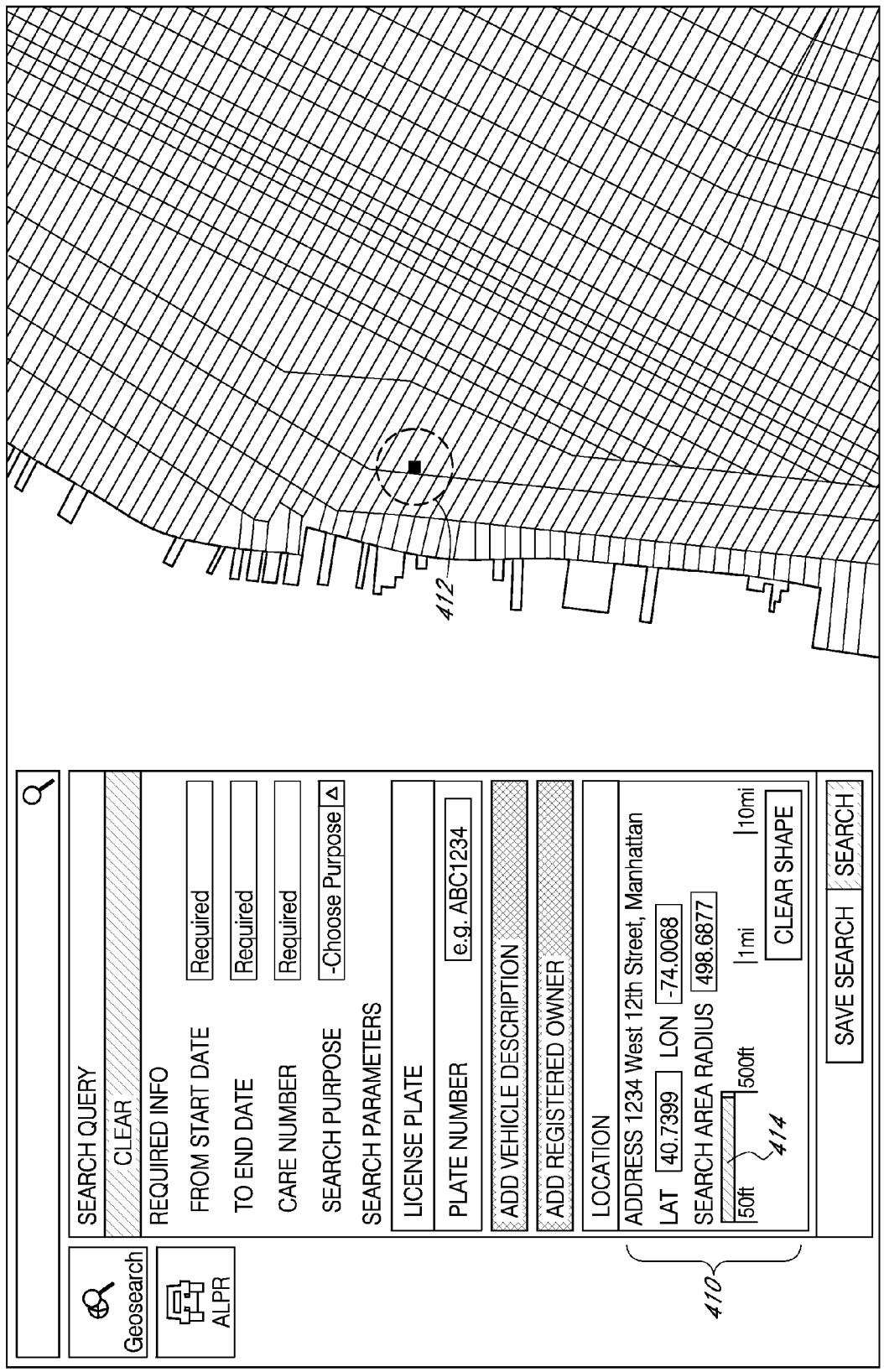

FIGS. 4A-4D illustrate sample user interfaces of the interactive vehicle information map system in which additional searching is performed and results are displayed, according to embodiments of the present disclosure. Referring to FIG. 4A, the user has selected to add location information to a search, as indicated at 402. As described above in reference to FIG. 1A, in an embodiment the user may provide location information by selecting the geosearch button. In an embodiment, selection of the geosearch button and/or the location button 402 may cause display of the Add at Address" button 404 and the "Draw Location" button 406. The user may select the "Add at Address" button 404 to provide an address of interest, and/or may select the "Draw Location" button 406 to draw a geographic area of interest on the map interface directly. In various embodiments, the user may draw various shapes (for example, a circle, an ellipse, a rectangle, a polygon, and/or any arbitrary as defined by straight and/or curved edges) on the map interface to define a geographic area of interest in which to limit a search. As shown on FIG. 4B, at indicator 410 the user may provide an address and/or a latitude and longitude of interest. Further, the user may specify a search radius 424. The geographic area may be indicated on the map interface, as shown at indicator 412. In an embodiment, the user may select the circle 412 to manually increase and/or decrease the radius of the search area. Alternatively, the user may adjust the radius of the search area by selecting and sliding the bar 414. In an embodiment, the user may specify a location of interest in any other way, including, for example, by neighborhood, city, state, zip code, and/or any other geographic indicator. In various embodiments, results may be derived from any (or multiple) of the information sources mentioned above, including LPR sources and/or DMV sources.

Figure 4C:
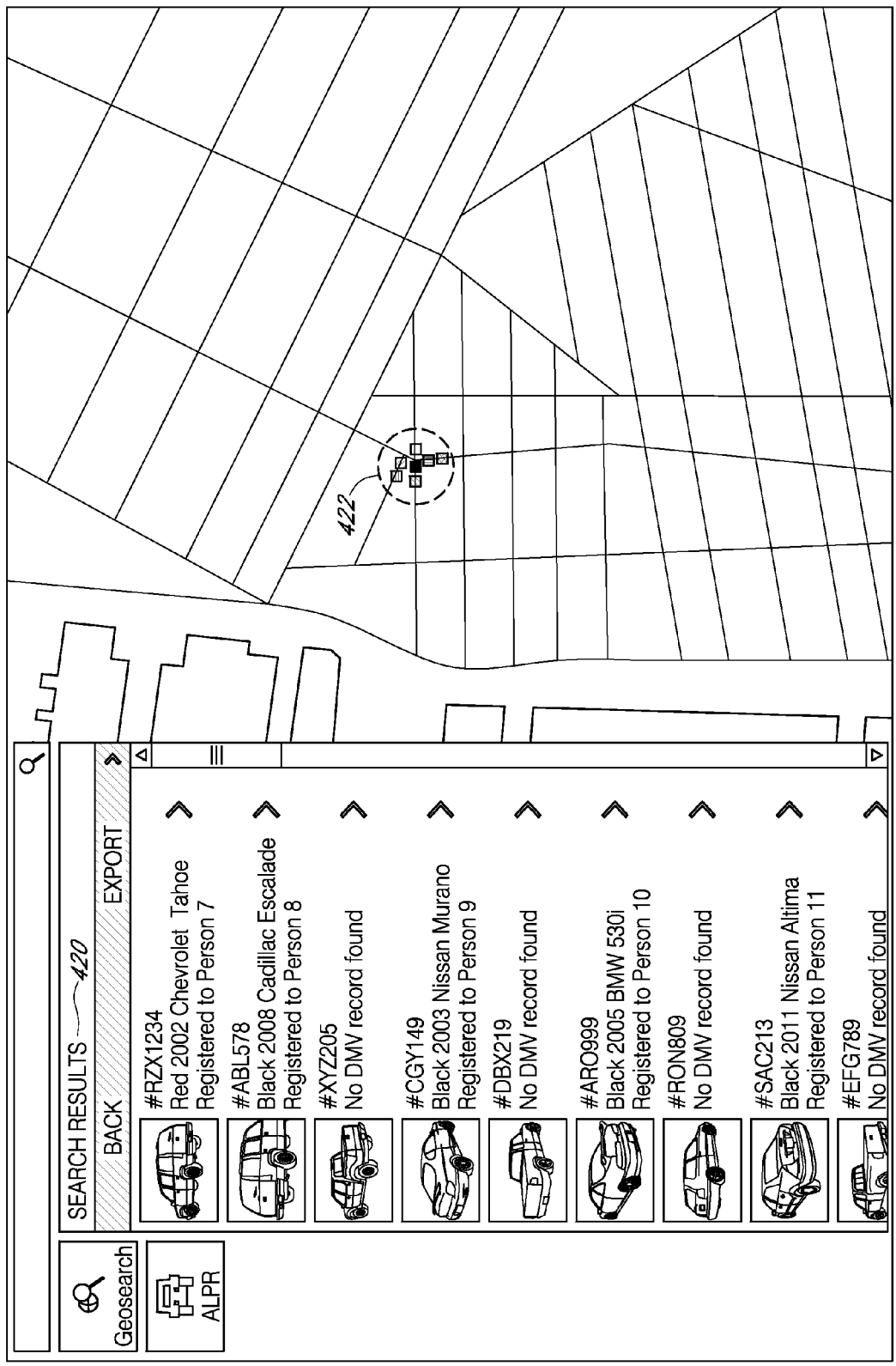

In an embodiment, the user may then select the search button to perform the search based on the provided search criteria (including the specified geographic area of interest). As shown in FIG. 4C, a list of vehicles satisfying the search criteria may be displayed in a list, such as a search results list 420 (similar to the search results list described in reference to FIG. 2A). Additionally, events/objects related to the listed vehicles, and meeting the search criteria, may be displayed in the map interface as indicated by 422.

Figure 4D:
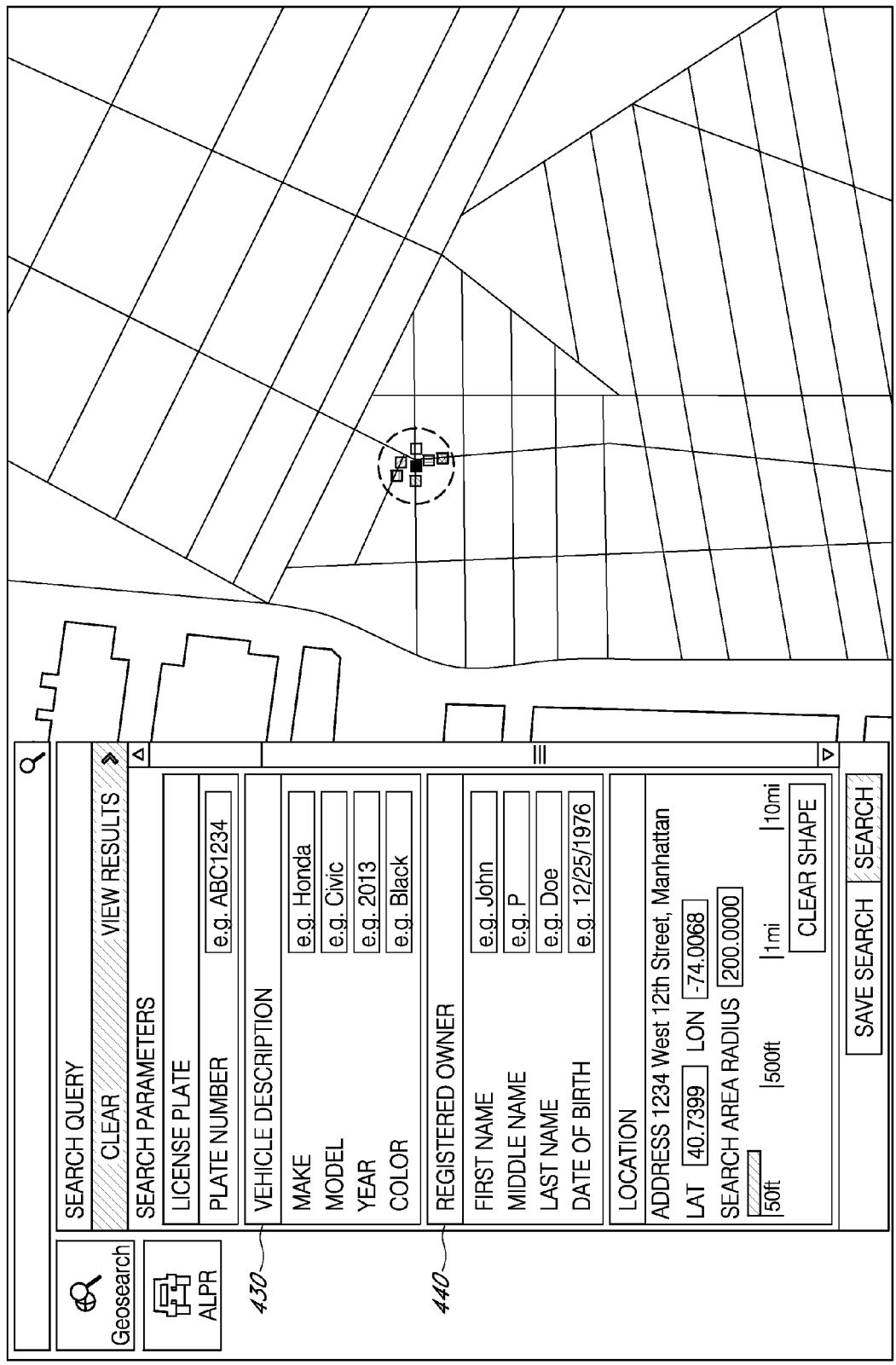

FIG. 4D shows various other search criteria including vehicle description information 430 and registered owner information 440 that may be provided by the user, according to various embodiments. In various embodiments, all or part of any item of search criteria may be provided by the user, including information in any combination. For example, the user may provide a vehicle make in combination with a last name of an owner. In another example, the user may provide a partial plate number, a vehicle color, and specify a particular geographic area of interest. In each of these examples, the map system may search any available vehicle-related data for data satisfying the search criteria, and display search results to the user as a list of identified vehicles. In various embodiments, the map system may further retrieve additional information related to any of the identified vehicles.

In an embodiment, the user interface may include an "animate" option associated with listed vehicles satisfying the search criteria and having multiple associated LPR reads. In this embodiment, selecting the "animate" options may cause the map system to display, on the map interface, the movement of the selected vehicle over time from one LPR read location to each subsequent LPR read location.

In various embodiments, the map system may include a "type-ahead" aspect associated with each of the search criteria text fields. The type-ahead aspect may cause a list of word completion options to be displayed as a user types search criteria information into a search field. For example, a user may begin typing a vehicle make by typing an "H". The map system may then display a number of possible completion options including, for example, "Honda," and "Hyundai." Additionally, the type-ahead aspect may match a user's search to combinations word completion options, for example, combined make/model vehicle pairs. For example, user may begin typing a vehicle make by typing an "H" and the map system may then display a number of possible completion options including, for example, "Honda Civic," and "Honda CR-V."

Additionally, in various embodiments, the map system may facilitate more accurate and/or easier searching by the user by automatically searching for similar, or easily misread/confused, characters (for example, in any of the search fields described above). For example, a user may provide a search query for license plates beginning with, or containing, a "5". In such an example, the map system may also automatically search for license plates beginning with, or containing, similar characters such as an "S". In other examples, an "I" (capital i) may also cause a search for a "1"; and/or "0", "O", and/or "D" may be transposed with one another. Accordingly, in an embodiment, the map system may facilitate searching for vehicle information when particular easily misread characters and/or words are included in a search field. In an embodiment, the map system may enable a user to enable or disable automatic searching for similar characters.

In various embodiments, the search criteria license plate number field may include the option of inputting multiple license plate numbers (or partial numbers) such that searches related to multiple numbers may be performed simultaneously.

In an embodiment, a user may optionally select a name of an owner associated with a vehicle to view additional available information related to the owner.

Vehicle Information Export

Figure 5A:
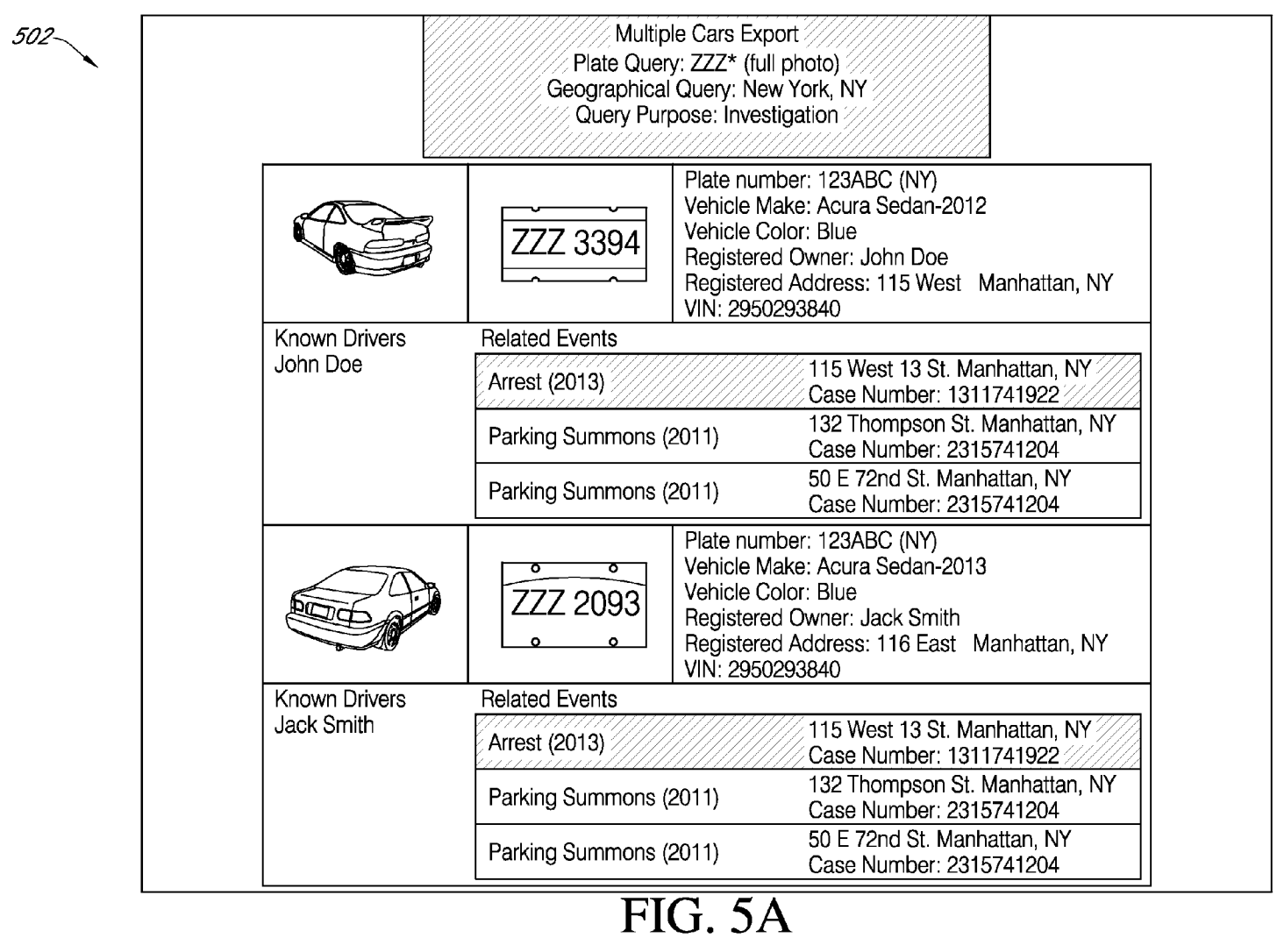
Figure 5B:
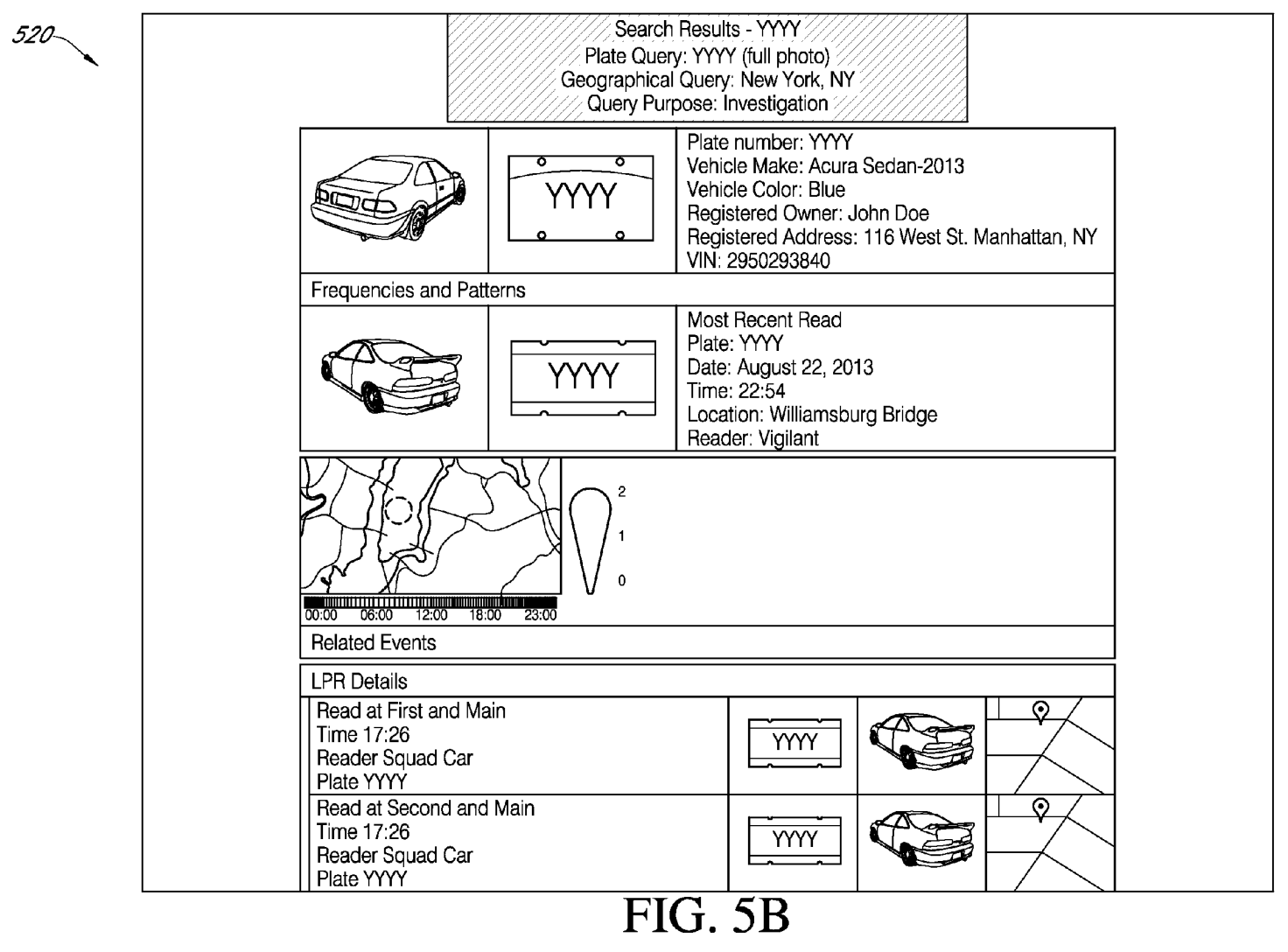

FIGS. 5A-5B illustrate sample user interfaces 502 and 520 of the interactive vehicle information map system in which vehicle information is exported, according to embodiments of the present disclosure. As described above, vehicle information related to one or more vehicles may be exported by the user. FIG. 5A shows an example user interface 502 including exported vehicle-related data associated with multiple vehicles satisfying particular search criteria. FIG. 5B shows an example user interface 520 including exported vehicle-related data associated with a single vehicle. In various embodiments, search alerts may be provided (for example, search alerts delivered via email) in a format similar to the export formats shown in FIGS. 5A and 5B. For example, in an embodiment a search alert may indicate new search results have been found (for example, LPR events associated with vehicles satisfying a particular search criteria), and may list various information associated with those search results (for example, addresses of locations of LPR events, maps showing LPR event locations, license plate and/or vehicle images, license plate numbers, and/or the like). In various embodiments, various search results user interfaces (for example, user interfaces 502, 520, and/or a search results user interface) may include a listing of search criteria or parameters associated with the search results.

In various embodiments, exported vehicle-related data may include vehicle photos (for example, from LPR reads), license plate photos, vehicle information, DMV information, related events (or event history) information, vehicle owner information, a frequency analysis or chart (for example, a chart that indicates the time of day at which LPR reads are most common, or a chart that indicates the frequency of LPR reads by day, weekday, hour, and/or the like), a map of the locations of LPR reads, a timeline indicating the times of LPR reads, among others. In various embodiments, the exported information may be exported in an HTML, XML, TXT, PDF, and/or any other suitable format.

Example Operations

Figure 6:
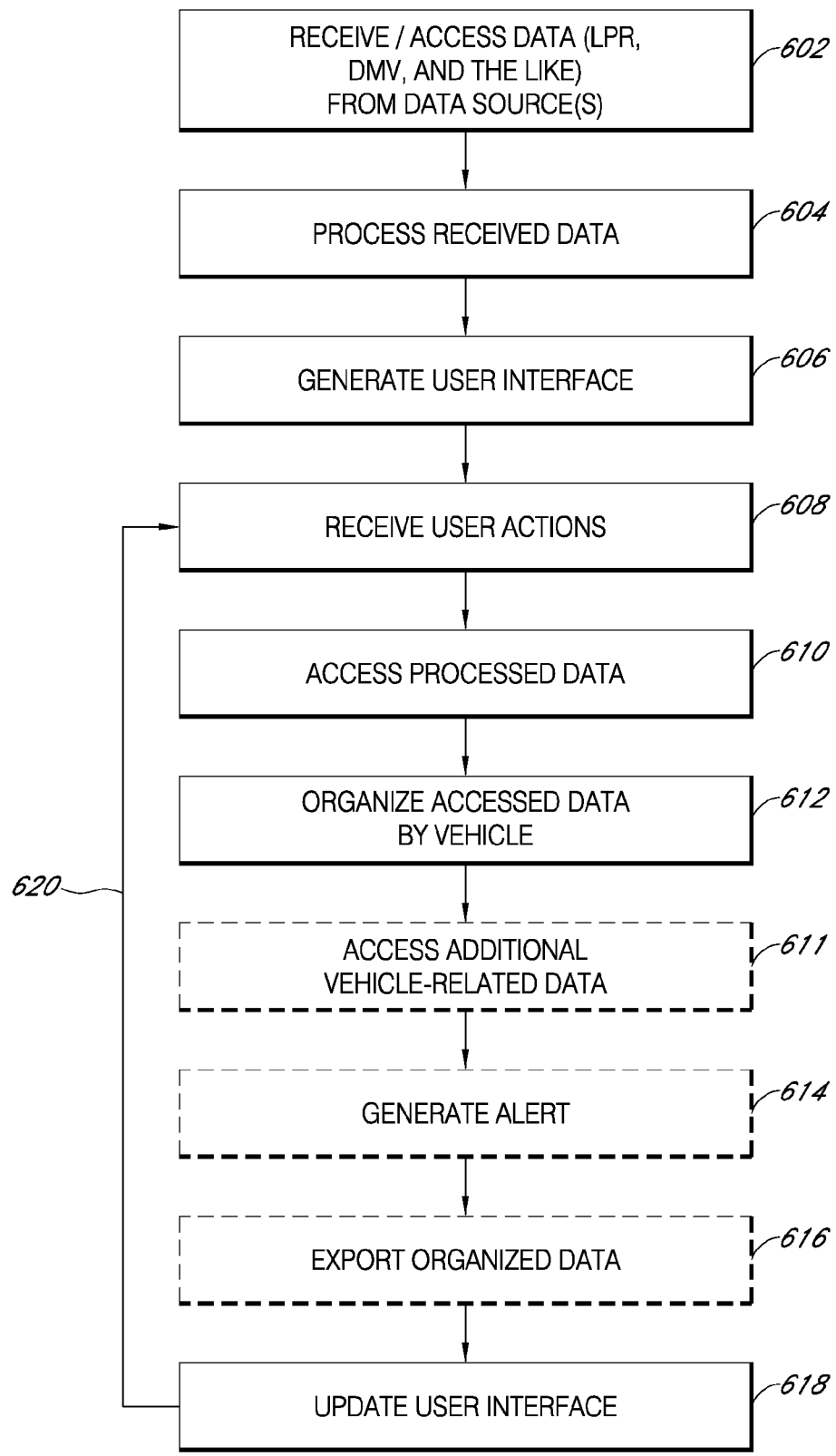
FIGS. 6-7 show flowcharts depicting illustrative operations of the interactive vehicle information map system, according to embodiments of the present disclosure.

FIG. 6 shows a flowchart depicting illustrative operations and/or processes of the interactive vehicle information map system, according to an embodiment of the present disclosure. In various embodiments, fewer blocks or additional blocks may be included in the processes, or various blocks may be performed in an order different from that shown in FIG. 6. In an embodiment, one or more blocks in FIG. 6 may be performed by, or implemented in, one or more computer modules and/or processors, as is described below with reference to FIGS. 8A-8B.

At block 602, various vehicle-related data may be received and/or accessed by the system from various databases and/or data sources (including, for example, from databases maintained by private entities, law enforcement entities, government entities (for example, a department of motor vehicles ("DMV")), LPR sources, and the like. In an embodiment, the vehicle-related data may be received at a server-side component of the system, such as the application server 858 of FIG. 8A. The data may then be processed by the server at block 604. For example, the vehicle-related data may be organized by location, time, type, and/or by any other useful index so as to enable fast searching of the data. At block 606, a user interface is generated that displays a user interface, as described with reference to the figures above. For example, a map interface and various search options may be displayed on the user interface.

At block 608, the user may interact with the user interface of the system in any of the ways described above, and as further described below in reference to FIG. 7. For example, the user may provide various search criteria to the system. At block 610, the processed vehicle-related data may be accessed by the system based on the provided search criteria, and data satisfying the provided search criteria may be determined and/or identified.

In various embodiments, the map system may access various internal and/or external databases in response to user actions. The various accessed internal and/or external databases may or may not include the processed vehicle-related data described above. For example, in response to a user request for information related to a particular person, the map system may access an external law enforcement database for criminal information related to the particular person. In various embodiments, the map system may "iteratively search" for data and information in response to a user action, for example, a search and/or selection of a particular vehicle and/or person. For example, in an embodiment, in response to an initial search for a particular license plate, the map system may, in a first iteration, access DMV data to determine information related to the particular license plate (for example, a registered owner name and address, and a vehicle description and vehicle identification number). Then, the map system may perform a second search iteration in which the obtained DMV data is used to access related data and information in a criminal event and/or law enforcement database (for example, to obtain citation information related to the determined vehicle and/or criminal event information related to the determined vehicle owner). Further, the map system may, in a third iteration, access additional databases (including previously accessed databases) to determine various other items of information related to data obtained in the second (and/or first) iteration. For example, the map system may access property ownership records related to a criminal event determined to be related to the vehicle owner. In various embodiments, data and information accessed in various "iterative" searches may include data objects. In an embodiment, the data and information accessed during interactive searches may be clustered. Examples of data clustering may be found in, for example, U.S. patent application Ser. No. 13/968,265, filed Aug. 15, 2013, titled "GENERATING DATA CLUSTERS WITH CUSTOMIZABLE ANALYSIS STRATEGIES," and U.S. patent application Ser. No. 13/968,213, filed Aug. 15, 2013, titled "PRIORITIZING DATA CLUSTERS WITH CUSTOMIZABLE SCORING STRATEGIES," each of which is hereby incorporated by reference herein in its entirety and for all purposes.

At block 612, the identified vehicle-related data satisfying the search criteria is organized into, and/or associated with, one or more vehicles. For example, two LPR reads may have been identified that meet the search criteria and include information related to a same or similar vehicle. For example, each of the LPR reads may indicate a license plate number of XRZ456. In another example, the two LPR reads may have similar license plate numbers, but they may differ slightly due to errors in optical character recognition (for example, one may indicate XRZ456, while the other may indicate XRZ458). In this example, other information related to the LPR reads, such as identified vehicle color, or determined owner information, may provide sufficient information to the system that the LPR reads may be associated with the same vehicle.

Once the vehicle-related data is organized by vehicle, at block 611 the system may optionally access additional vehicle-related data from other sources that is determined to be related to the identified vehicles. For example, DMV information may indicate an owner and vehicle description associated with the vehicle with license plate XRZ456. Further, law enforcement data may indicate various events related to either the indicated owner and/or the vehicle with license plate XRZ456. Any such additional data may be accessed, aggregated, and associated with the identified vehicle such that it may be made available to the user of the map system.

At optional block 614 a search alert may be generated by the map system in response to the user selection (as described above). At optional block 616, the organized vehicle data may be exported in response to a user selection (as described above). At block 618, the user interface may be updated in response to the operator's actions. For example, search results may be displayed, vehicle detailed information may be displayed, events/objects may be displayed on a map interface, among other interface updates described above.

In various embodiments, vehicle-related data may be received and processed by the system at any time and/or continuously. In an embodiment, vehicle-related data may be updated even as the user is viewing the data on the user interface. For example, in an embodiment, the user may use the system to analyze substantially real-time vehicle-related data.

Figure 7:
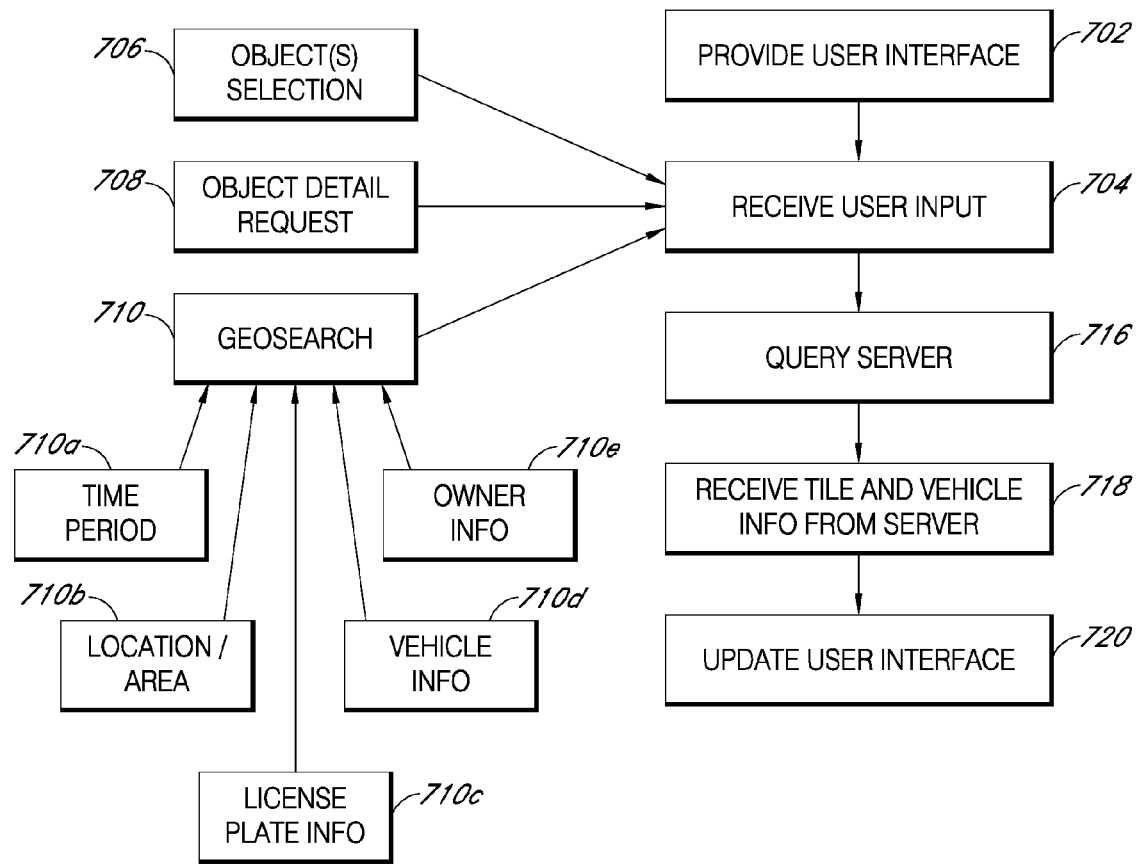

FIG. 7 shows a flowchart depicting additional illustrative operations and/or processes of the interactive vehicle information map system, according to embodiments of the present disclosure. In various embodiments, fewer blocks or additional blocks may be included in the process, or various blocks may be performed in an order different from that shown in FIG. 7. In an embodiment, one or more blocks in FIG. 7 may be performed by, or implemented in, one or more computer modules and/or processors, as is described below with reference to FIGS. 8A-8B.

At block 702, the user interface is provided to the user, and at block 704 an input from the user is received as described above in reference to FIG. 6. Examples of inputs received from the user may include, for example, an object selection (706), an object detail request (708), and/or a geosearch (710), among others. Further, the geosearch (710) may include various search criteria provided by the user including a time period (710a), a geographic location or area (710b), license plate information (710c), vehicle information (710d), and/or owner information (710e), among others.

Figure 8A:
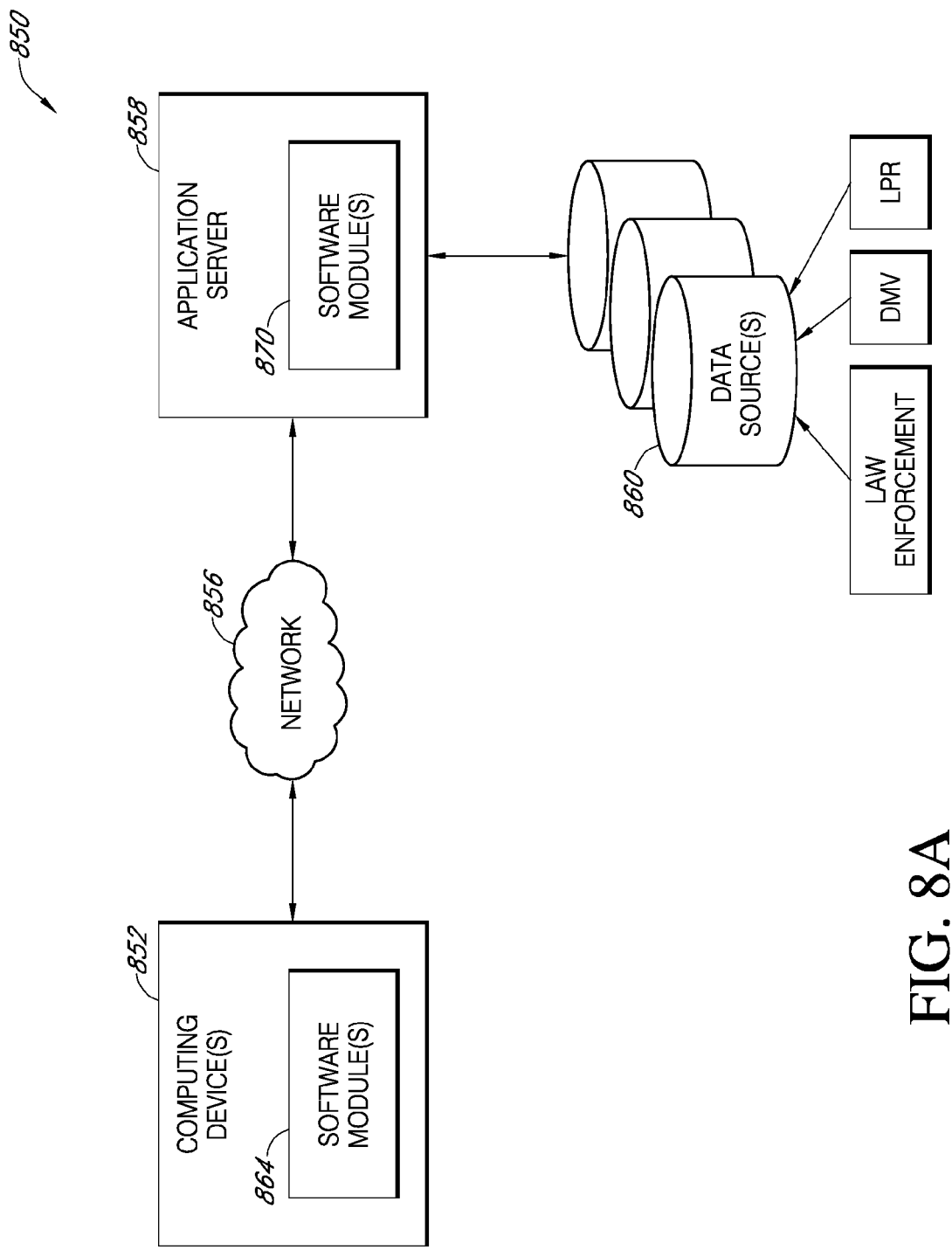
FIGS. 8A-8B illustrate a network environment and computer systems and devices with which various methods and systems discussed herein may be implemented, according to various embodiments of the present disclosure.

In an embodiment, the user inputs may be provided at client-side devices of the map system, such as computing device(s) 852 of FIG. 8A. At block 716, the user inputs may result in queries (such as search queries) to server-side devices of the map system, such as application server 858 of FIG. 8A. The queries may be in response to any of inputs 706, 708, and/or 710 from the user. In various embodiments, the server-side components then update and re-compose map tiles of the map interface, and provide vehicle-related data, in accordance with the user input, and transmits the updates back to the client-side components. Examples of processes for updating map tiles may be found in the '571 Application.

At block 718, the client-side components receive the updated map tile and vehicle information from the server, and at block 720 the user interface is updated with the received information.

In an embodiment, additional information and/or data, in addition to updated map tiles, may be transmitted to the client-side components from the server-side components. For example, object metadata may be transmitted in response to a user selecting an object.

In an embodiment, one or more blocks in FIG. 7 may be performed by client-side components of the map system, for example, computing device(s) 852.

Advantageously, in various embodiments the interactive vehicle information map system enables a user to efficiently search through large amounts of vehicle-related data from many disparate sources. The user may, for example, specify various search criteria including time frames, geographic areas, license plate numbers, vehicle descriptions, and/or owner descriptions. Further, search results may be organized into particular vehicles. In various embodiments, vehicle-related data may be plotted on an interactive map. Additionally, a user may export search results and/or initiate a search alert.

Implementation Mechanisms

FIG. 8A illustrates a network environment in which the interactive vehicle information map system may operate, according to embodiments of the present disclosure. The network environment 850 may include one or more computing devices 852, a network 856, an application server 858, and one or more data sources 860. The constituents of the network environment 850 may be in communication with each other either locally or over the network 856.

In an embodiment, the computing device(s) 852 may be any computing devices capable of displaying software applications to a user and receiving input from the user. For example, the computing device(s) 852 may include smartphones, tablets, laptops, and/or other types of computing devices. The computing device(s) 852 may also be capable of communicating over the network 856, for example, to request data from, and/or to data to, the application server 858.

In some embodiments, the computing device(s) 852 may include non-transitory computer-readable medium storage for storing vehicle-related data and/or other map application data. For example, computing device(s) 852 may include one or more software modules 864 that may implement aspects of the functionality of the interactive vehicle information map system. The software module(s) 864 may be configured to present the map application to a user and receive interactions from the user. Additional aspects, operations, and/or functionality of computing device(s) 852 are described in further detail in reference to FIG. 8B below.

The network 856 may be any wired network, wireless network, or combination thereof. In addition, the network 856 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The application server 858 is a computing device, similar to the computing devices described above, that may perform a variety of tasks to implement the operations of the interactive vehicle information map system. The interaction server may include one or more software modules 870 that may be configured to, for example, receive vehicle-related data, process vehicle-related data, generate map tiles, process inputs from the user, and/or update the user interface. Additional aspects, operations, and/or functionality of application server 858 are described in further detail in referenced to FIG. 8B below.

The application server 858 may be in communication with data source(s) 860. The data source(s) 860 may include, for example, law enforcement data sources, DMV data sources, LPR data sources, and/or other public, private, and/or government data sources. One or more of the data source(s) 860 may include electronic storage local to the application server 858. The data source(s) 860 may be embodied in hard disk drives, solid state memories, and/or any other type of non-transitory, computer-readable storage medium remotely or locally accessible to the application server 858. The data source(s) 860 may also be distributed or partitioned across multiple storage devices as is known in the art without departing from the spirit and scope of the present disclosure.

In various embodiments, the system may be accessible by the user through a web-based viewer, such as a web browser. In this embodiment, the user interface may be generated by the application server 858 and transmitted to the web browser of the user. Alternatively, data necessary for generating the user interface may be provided by the application server 858 to the browser, where the user interface may be generated. The user may then interact with the user interface through the web-browser. In an embodiment, the user interface of the interactive vehicle information map system may be accessible through a dedicated software application. In an embodiment, the user interface of the interactive vehicle information map system may be accessible through a mobile computing device, such as a smartphone and/or tablet. In this embodiment, the application server 858 may generate and transmit a user interface to the mobile computing device. Alternatively, the mobile computing device may include modules for generating the user interface, and the application server 858 may provide user interaction data to the mobile computing device. In an embodiment, the application server 858 comprises a mobile computing device.

According to various embodiments, the interactive vehicle information map system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8B:
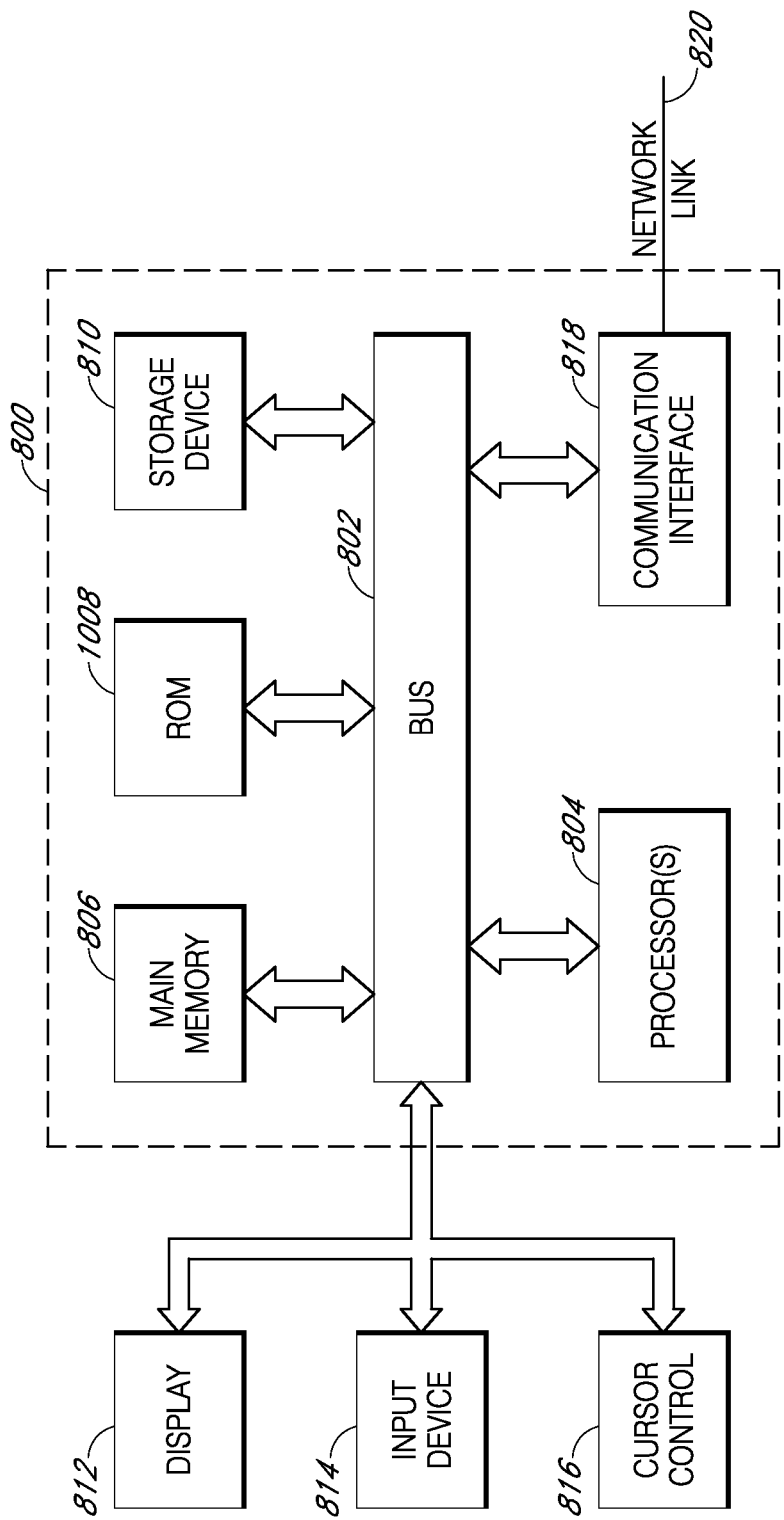

For example, FIG. 8B is a block diagram that illustrates a computer system 800 upon which the various systems, devices, and/or methods discussed herein may be implemented. For example, some or all aspects of computing system 800 may be included in any of computing device(s) 852 and/or application server 858. In an embodiment, each of the computing device(s) 852 and application server 858 is comprised of a computing system similar to the computer system 800 of FIG. 8B. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT), LCD display, or touch screen display, for displaying information to a computer user and/or receiving input from the user or operator. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include modules configured to generate a user interface, map interface, and/or the various other aspects of the interactive vehicle information map system. These modules may include, for example, software module(s) 864 and/or software module(s) 870 described above, among others. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that may be connected to any other interface and/or network, for example network 856 of FIG. 8A. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through one or more local or non-local networks to host computers or other data equipment operated by an Internet Service Provider (ISP).

In an embodiment, the network link 820 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 820 and through communication interface 818, which carry the digital data to and from computer system 800, are example forms of transmission media.

Computer system 800 may send messages and/or receive data, including program code, through the network(s), network link 820 and communication interface 818. In the Internet example, a server or other computer-enabled device or system may transmit a requested code for an application program through one or more networks and/or communication interface 818.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to access one or more electronic data sources in response to input from a user provided in an interactive user interface in order to determine vehicle-related data items and interactively update the interactive user interface, the computer system comprising:
   one or more hardware processors configured to cause the computer system to:
      generate user interface data useable for rendering an interactive user interface, the interactive user interface including an interactive map;
      transmit the user interface data to an electronic display such that the interactive user interface is displayed on the electronic display;
      receive an input from a user via the interactive user interface, the input including at least an indication of a geographic area of interest and a partial vehicle description including at least a partial license plate number, the indication of the geographic area of interest provided via a selection on the interactive map;
      identify, from one or more electronic data sources, a plurality of vehicle-related data items satisfying the partial vehicle description including the partial license plate number, each of the identified vehicle-related data items associated with a full license plate number and at least one license plate image, each of the identified vehicle-related data items obtained within the indicated geographic area of interest;
      organize the plurality of identified vehicle-related data items into a plurality of groups each corresponding to a unique vehicle, wherein each of at least two of the groups includes a plurality of identified vehicle-related data items associated with a same full license plate number;
      for each of the one or more groups corresponding to respective unique vehicles, and based on the respective associated vehicle-related data items:
         select a preferred license plate image of the at least one license plate image associated with the vehicle by at least:
            selecting, from the at least one license plate image, a first subset of license plate images having been obtained within a preferred time period;
            further selecting, from the previously selected first subset of license plate images, a second subset of license plate images having been obtained during a preferred time of day; and
            designating, from the previously selected second subset of license plate images, the preferred license plate image, the preferred license plate image of the second subset having been obtained by a preferred type of camera; and
         identify, from the one or more electronic data sources, one or more individuals associated with the unique vehicle; and
      update the user interface data such that the interactive user interface includes, for each of the one or more groups corresponding to respective unique vehicles:
         indications on the interactive map of geographical locations associated with each of the identified vehicle-related data items;
         indications of the respective unique vehicles and associated preferred license plate image; and
         a selectable user interface element configured to, in response to a selection input from the user, provide, via the interactive user interface, indications of the one or more identified individuals and information related to the one or more identified individuals.

2. The computer system of claim 1, wherein the one or more hardware processors are further configured to cause the computer system to:
   receive a second input from the user via the interactive user interface, the second input indicating a selection of one of the indications of the unique vehicles; and
   in response to the second input:
      update the user interface data such that the interactive user interface includes an enlarged version of the associated preferred license plate image.

3. The computer system of claim 1, wherein the one or more hardware processors are further configured to cause the computer system to:
   receive a second input from the user via the interactive user interface, the second input indicating a request to establish a search alert based on the partial vehicle description; and
   in response to the second input, periodically:
      identify, from the one or more electronic data sources, one or more new vehicle-related data items that satisfy the partial vehicle description,
      associate each of the identified new vehicle-related data items with one or more corresponding unique vehicles; and
      provide to the user an alert including one or more of the unique vehicles having new vehicle-related data items associated therewith.

4. The computer system of claim 3, wherein the alert is provided to the user via an email to the user.

5. The computer system of claim 3, wherein the provided alert includes only unique vehicles not previously provided in an alert.

6. The computer system of claim 3, wherein the alert includes at least a portion of the associated new vehicle-related data items associated with respective unique vehicles.

7. The computer system of claim 1, wherein the one or more hardware processors are further configured to cause the computer system to:
   in response to the input including the indication of the geographic area of interest, update the user interface data such that the interactive user interface:
      highlights a portion of an interactive map representing the indicated geographic area.

8. The computer system of claim 7, wherein the one or more hardware processors are further configured to cause the computer system to:

receive a second input from the user via the interactive user interface, the second input including a selection of one of the indications on the interactive map of the vehicle-related data items; and update the user interface data such that interactive user interface highlights the unique vehicle associated with the selected one of the indications.

9. The computer system of claim 1, wherein the one or more electronic data sources include at least one of: a vehicle owner information data source, a vehicle license plate data source, a law enforcement data source, a traffic incident data source, a license-plate recognition data source, or a criminal event data source.

10. The computer system of claim 1, wherein the input from the user further includes at least one of: an indication of a time period of interest, or at least part of an identifier of an owner of a vehicle.

11. The computer system of claim 10, wherein identifying one or more vehicle-related data items further includes identifying one or more vehicle-related data items that satisfy the at least one of the indication of the time period of interest, of the at least part of an identifier of an owner of a vehicle.

12. The computer system of claim 1, wherein the one or more hardware processors are further configured to cause the computer system to:

receive a second input from the user via the interactive user interface, the second input including a selection of a first unique vehicle from the indications of the unique vehicles; and update the user interface data such that the interactive user interface includes, for the first unique vehicle, further information including law enforcement activity related to an individual associated with the first unique vehicle.

13. The computer system of claim 1, wherein the one or more hardware processors are further configured to cause the computer system to:

receive a second input from the user via the interactive user interface, the second input indicating a request for a formatted user interface including a listing of at least two of the unique vehicles and details associated with each; and generate user interface data useable for rendering an exportable interactive user interface, the exportable interactive user interface including a listing of each of the at least two of the unique vehicles and details associated with each of the at least two of the unique vehicles, wherein the details associated with each of the at least two of the unique vehicles include:
the preferred license plate image;
the full license plate number;
a vehicle description;
a listing of the one or more identified individuals; and
associated law enforcement-related data items including at least one of a traffic incident or a criminal incident.

14. A computer-implemented method of accessing one or more electronic data sources in response to input from a user provided in an interactive user interface in order to determine vehicle-related data items and interactively update the interactive user interface, the computer-implements method comprising:

under control of a computing system configured with specific computer executable instructions, generating user interface data useable for rendering an interactive user interface, the interactive user interface including an interactive map;

transmitting the user interface data to an electronic display such that the interactive user interface is displayed on the electronic display;

receiving an input from a user via the interactive user interface, the input including at least an indication of a geographic area of interest and a partial vehicle description including at least a partial license plate number, the indication of the geographic area of interest provided via a selection on the interactive map;

identifying, from one or more electronic data sources, a plurality of vehicle-related data items satisfying the partial vehicle description including the partial license plate number, each of the identified vehicle-related data items associated with a full license plate number and at least one license plate image, each of the identified vehicle-related data items obtained within the indicated geographic area of interest;

organizing the plurality of identified vehicle-related data items into a plurality of groups each corresponding to a unique vehicle, wherein each of at least two of the groups includes a plurality of identified vehicle-related data items associated with a same full license plate number;

for each of the one or more groups corresponding to respective unique vehicles, and based on the respective associated vehicle-related data items:

selecting a preferred license plate image of the at least one license plate image associated with the vehicle by at least:

selecting, from the at least one license plate image, a first subset of license plate images having been obtained within a preferred time period;

further selecting, from the previously selected first subset of license plate images, a second subset of license plate images having been obtained during a preferred time of day; and designating, from the previously selected second subset of license plate images, the preferred license plate image, the preferred license plate image of the second subset having been obtained by a preferred type of camera; and identifying, from the one or more electronic data sources, one or more individuals associated with the unique vehicle; and updating the user interface data such that the interactive user interface includes, for each of the one or more groups corresponding to respective unique vehicles:

indications on the interactive map of geographical locations associated with each of the identified vehicle-related data items;

indications of the respective unique vehicles and associated preferred license plate image; and a selectable user interface element configured to, in response to a selection input from the user, provide, via the interactive user interface, indications of the one or more identified individuals and information related to the one or more identified individuals.

15. The computer-implemented method of claim 14, further comprising:

under control of the computing system configured with specific computer executable instructions, receiving a second input from the user via the interactive user interface, the second input indicating a selection of one of the indications of the unique vehicles; and in response to the second input:
    updating the user interface data such that the interactive user interface includes an enlarged version of the associated preferred license plate image.

16. The computer-implemented method of claim 14, further comprising:
    under control of the computing system configured with specific computer executable instructions,
        receiving a second input from the user via the interactive user interface, the second input including a selection of a first unique vehicle from the indications of the unique vehicles; and
        updating the user interface data such that the interactive user interface includes, for the first unique vehicle, further information including law enforcement activity related to an individual associated with the first unique vehicle.

17. The computer-implemented method of claim 14, further comprising:
    under control of the computing system configured with specific computer executable instructions,
        receiving a second input from the user via the interactive user interface, the second input indicating a request for a formatted user interface including a listing of at least two of the unique vehicles and details associated with each; and
        generating user interface data useable for rendering an exportable interactive user interface, the exportable interactive user interface including a listing of each of the at least two of the unique vehicles and details associated with each of the at least two of the unique vehicles, wherein the details associated with each of the at least two of the unique vehicles include:
            the preferred license plate image;
            the full license plate number;
            a vehicle description;
            a listing of the one or more identified individuals; and
            associated law enforcement-related data items including at least one of a traffic incident or a criminal incident.

18. A non-transitory computer readable storage medium storing computer executable instructions configured for execution by one or more hardware processors of a computer system to cause the computer system to:
    generate user interface data useable for rendering an interactive user interface, the interactive user interface including an interactive map;
    transmit the user interface data to an electronic display such that the interactive user interface is displayed on the electronic display;
    receive an input from a user via the interactive user interface, the input including at least an indication of a geographic area of interest and a partial vehicle description including at least a partial license plate number, the indication of the geographic area of interest provided via a selection on the interactive map;
    identify, from one or more electronic data sources, a plurality of vehicle-related data items satisfying the partial vehicle description including the partial license plate number, each of the identified vehicle-related data items associated with a full license plate number and at least one license plate image, each of the identified vehicle-related data items obtained within the indicated geographic area of interest;
    organize the plurality of identified vehicle-related data items into a plurality of groups each corresponding to a unique vehicle, wherein each of at least two of the groups includes a plurality of identified vehicle-related data items associated with a same full license plate number;
    for each of the one or more groups corresponding to respective unique vehicles, and based on the respective associated vehicle-related data items:
        select a preferred license plate image of the at least one license plate image associated with the vehicle by at least:
            selecting, from the at least one license plate image, a first subset of license plate images having been obtained within a preferred time period;
            further selecting, from the previously selected first subset of license plate images, a second subset of license plate images having been obtained during a preferred time of day; and
            designating, from the previously selected second subset of license plate images, the preferred license plate image, the preferred license plate image of the second subset having been obtained by a preferred type of camera; and
        identify, from the one or more electronic data sources, one or more individuals associated with the unique vehicle; and
    update the user interface data such that the interactive user interface includes, for each of the one or more groups corresponding to respective unique vehicles:
        indications on the interactive map of geographical locations associated with each of the identified vehicle-related data items;
        indications of the respective unique vehicles and associated preferred license plate image; and
        a selectable user interface element configured to, in response to a selection input from the user, provide, via the interactive user interface, indications of the one or more identified individuals and information related to the one or more identified individuals.

19. The non-transitory computer readable storage medium of claim 18, wherein the computer executable instructions are further configured for execution by the one or more hardware processors of the computer system to cause the computer system to:
    receive a second input from the user via the interactive user interface, the second input indicating a selection of one of the indications of the unique vehicles; and
    in response to the second input:
        update the user interface data such that the interactive user interface includes an enlarged version of the associated preferred license plate image.

20. The non-transitory computer readable storage medium of claim 18, wherein the computer executable instructions are further configured for execution by the one or more hardware processors of the computer system to cause the computer system to:
    receive a second input from the user via the interactive user interface, the second input indicating a request for a formatted user interface including a listing of at least two of the unique vehicles and details associated with each; and
    generate user interface data useable for rendering an exportable interactive user interface, the exportable interactive user interface including a listing of each of the at least two of the unique vehicles and details associated with each of the at least two of the unique vehicles, wherein the details associated with each of the at least two of the unique vehicles include:
        the preferred license plate image;

the full license plate number;
a vehicle description;
a listing of the one or more identified individuals; and
associated law enforcement-related data items including at least one of a traffic incident or a criminal incident.

* * * * *